United States Patent
Honda et al.

(10) Patent No.: US 12,366,443 B2
(45) Date of Patent: Jul. 22, 2025

(54) SURFACE INSPECTION DEVICE AND SHAPE MEASUREMENT SOFTWARE

(71) Applicant: HITACHI HIGH-TECH CORPORATION, Tokyo (JP)

(72) Inventors: Toshifumi Honda, Tokyo (JP); Takeru Utsugi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 150 days.

(21) Appl. No.: 18/284,774

(22) PCT Filed: Apr. 6, 2021

(86) PCT No.: PCT/JP2021/014680
§ 371 (c)(1),
(2) Date: Sep. 28, 2023

(87) PCT Pub. No.: WO2022/215179
PCT Pub. Date: Oct. 13, 2022

(65) Prior Publication Data
US 2024/0159520 A1    May 16, 2024

(51) Int. Cl.
*G01B 11/24* (2006.01)
*G01N 21/95* (2006.01)

(52) U.S. Cl.
CPC ..... *G01B 11/2441* (2013.01); *G01N 21/9505* (2013.01)

(58) Field of Classification Search
CPC ............ G01B 9/02091; G01B 2290/70; G01B 11/24; G01B 2210/56; G01B 11/272;
(Continued)

(56) References Cited

U.S. PATENT DOCUMENTS

2010/0085637 A1  4/2010  Liu et al.
2011/0279823 A1* 11/2011  Ueki ................... G01M 11/025
                                                356/511
(Continued)

FOREIGN PATENT DOCUMENTS

JP  2001165640 A * 6/2001
JP  2007107960 A * 4/2007
(Continued)

OTHER PUBLICATIONS

Search Report mailed Jun. 22, 2021 in International Application PCT/JP2021/014680.
(Continued)

*Primary Examiner* — Michael P Stafira
(74) *Attorney, Agent, or Firm* — Miles & Stockbridge, P.C.

(57) ABSTRACT

A defect inspection apparatus that includes a differential interference contrast illumination system that irradiates a sample surface with an illumination spot set composed of two polarized illumination spots that have different phases at a predetermined wavelength and that are offset by a predetermined shear amount, a differential interference contrast detection system that condenses reflected light beams of the two polarized illumination spots reflected from the sample surface to generate interference light beams, a scanning unit that scans the sample surface using the two polarized illumination spots, a sensor unit that photoelectrically converts the interference light beams generated by the differential interference contrast detection system to generate interference signals, a height displacement measurement unit that processes the interference signals to measure height displacement between the illumination spots, and a height shape reconstruction unit that accumulates height displace-
(Continued)

ment data of the illumination spots and reconstructs a height shape of the sample surface.

9 Claims, 24 Drawing Sheets

(58) Field of Classification Search
CPC .......................... G01B 9/02075; G01B 11/02; G01B 11/2513; G01B 11/2536; G01B 11/14; G01B 9/02; G01B 11/2441; G01B 9/0209; G01B 11/00; G01B 11/0608; G01B 11/303; G01B 11/0658; G01B 9/02011; G01B 9/02019; G01B 9/02032; G01B 9/02047; G01B 9/02048; G01B 9/02068; G01B 9/02083; G01B 11/0641; G01B 11/285; G01B 2290/45; G01B 9/02005; G01B 9/02097; G01B 11/0666; G01B 11/30; G01B 9/02043; G01B 9/021; G01B 2290/30; G01B 9/02024; G01B 9/02057; G01B 9/02082; G01N 21/21; G01N 21/8806; G01N 21/4795; G01N 21/47; G01N 21/9501; G01N 21/4788; G01N 21/95; G01N 2021/4792; G01N 21/23; G01N 21/956; G01N 21/84; G01N 2021/8848; G01N 21/00; G01N 2021/8822; G01N 2021/4709; G01N 2021/4711; G01N 2021/8461; G01N 21/65; G01N 21/93; G01N 21/94; G01N 2021/8466; G01N 2021/8816; G01N 2021/95638; G01N 2021/95646; G01N 21/6458; G01N 21/8851; G01N 27/126; G01N 33/0036; G01N 33/0047; G01N 33/4833; G01N 2015/1454; G01N 2021/653; G01N 2021/655; G01N 2021/8444; G01N 21/359; G01N 21/4738; G01N 21/9506; G01N 2021/8835; G01N 2021/8887; G01N 2021/9513; G01N 21/31; G01N 21/6456; G01N 21/9505; G01N 21/95607; G01N 15/0205; G01N 15/0227; G01N 15/1468; G01N 2015/0053; G01N 21/45; G01N 2201/0675; G01N 2015/0038; G01N 2021/1765; G01N 2021/216; G01N 2021/6463; G01N 21/01; G01N 21/251; G01N 21/6428; G01N 21/658; G01N 2201/063; G01N 33/32; G01N 15/1433; G01N 15/1434; G01N 2015/1006; G01N 2021/178; G01N 2021/1787; G01N 21/6445; G01N 21/6486; G01N 21/88; G01N 22/00; G01N 2201/0627
See application file for complete search history.

(56) References Cited

U.S. PATENT DOCUMENTS

| | | | |
|---|---|---|---|
| 2017/0115231 A1* | 4/2017 | Urano | ................ G01N 21/4795 |
| 2022/0178846 A1 | 6/2022 | Yamada et al. | |

FOREIGN PATENT DOCUMENTS

| | | | | |
|---|---|---|---|---|
| JP | 2008026065 A | * | 2/2008 | |
| JP | 2010066079 A | * | 3/2010 | ............. G01N 21/47 |
| JP | 2012-068201 A | | 4/2012 | |
| JP | 2013-164281 A | | 8/2013 | |
| JP | 2013190252 A | * | 9/2013 | ......... G01N 21/8806 |
| WO | WO-2009100867 A1 | * | 8/2009 | ......... G03F 7/70633 |
| WO | WO-2020136785 A1 | * | 7/2020 | ............. G01N 21/47 |
| WO | 2020208680 A1 | | 10/2020 | |
| WO | WO-2020246015 A1 | * | 12/2020 | |
| WO | WO-2021024319 A1 | * | 2/2021 | ......... G01N 21/9501 |

OTHER PUBLICATIONS

Written Opinion mailed Jun. 22, 2021 in International Application PCT/JP2021/014680.
International Preliminary Report on Patentability mailed Mar. 22, 2022 in International Application No. PCT/JP2021/014680.

* cited by examiner

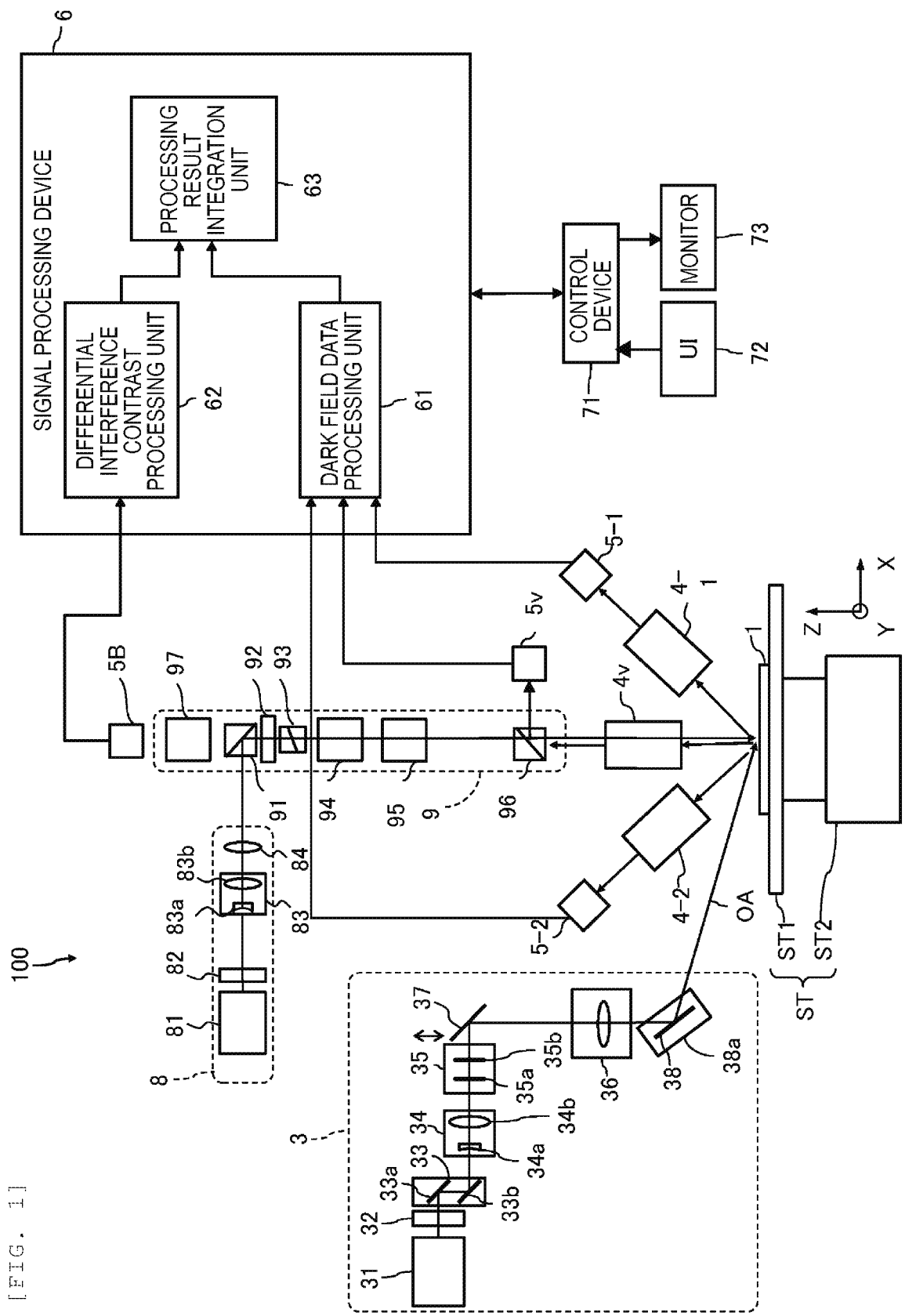

[FIG. 2]
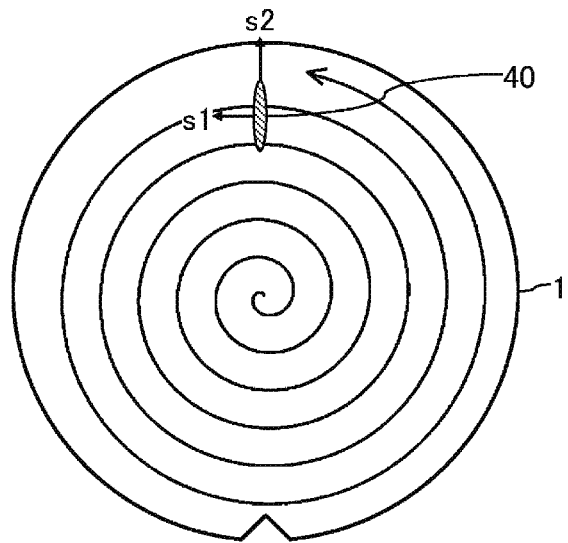
[FIG. 3]
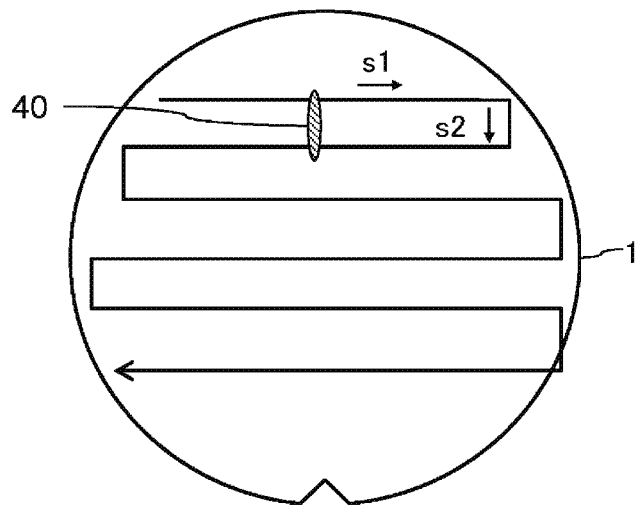
[FIG. 4]
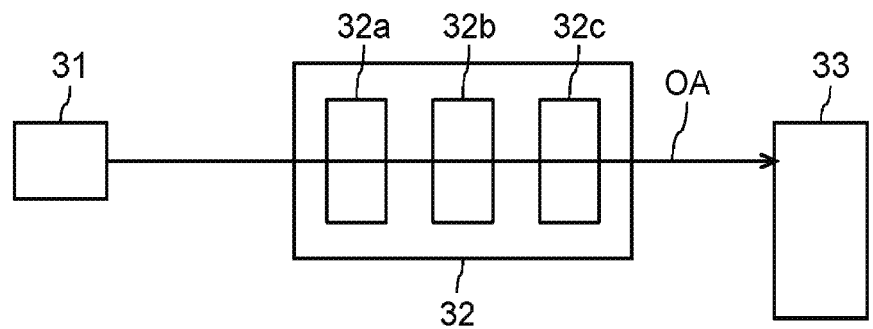

[FIG. 5]
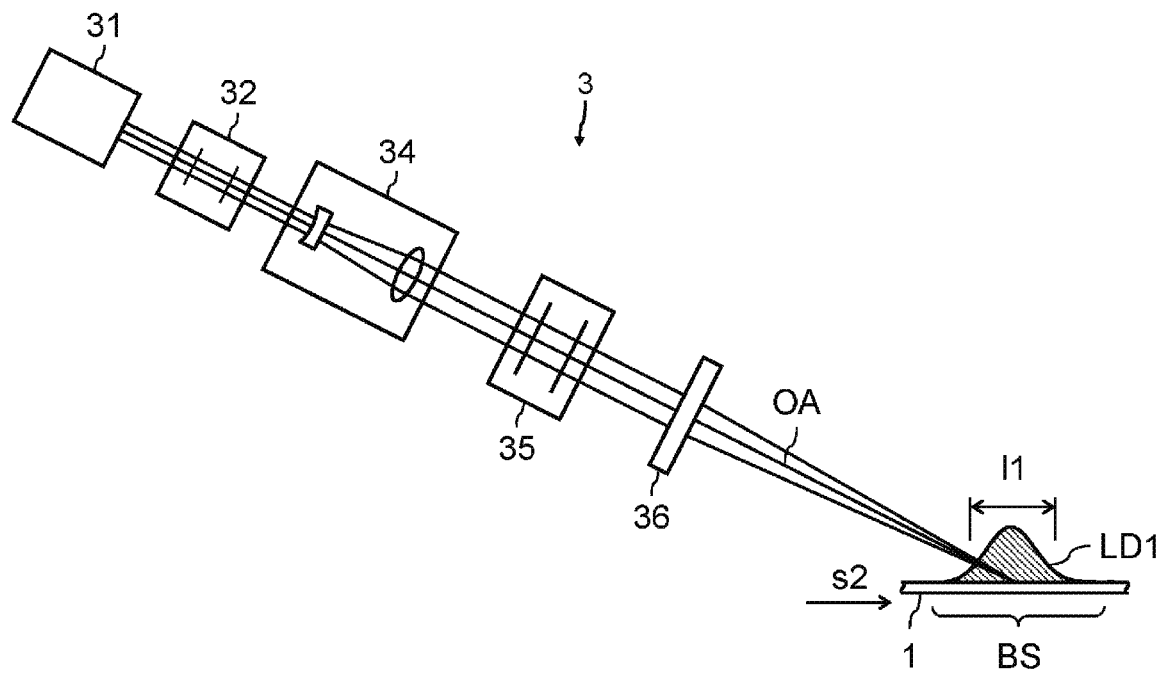
[FIG. 6]
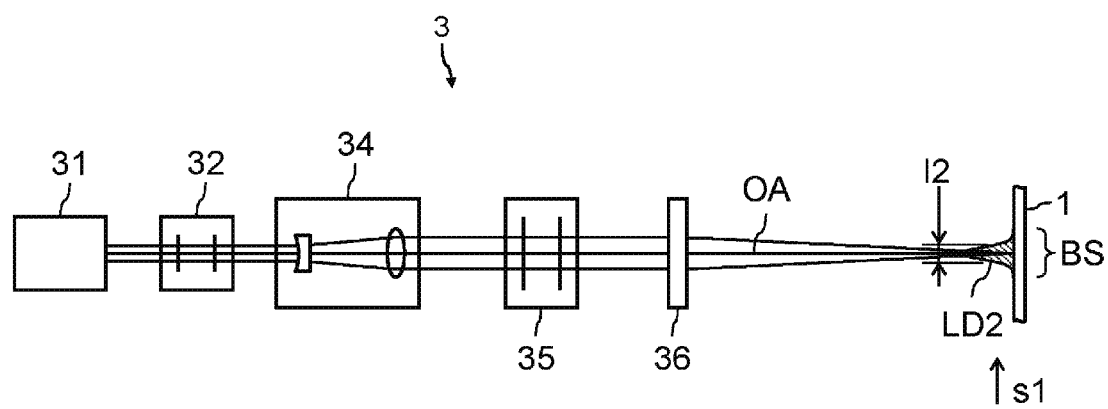

[FIG. 7]
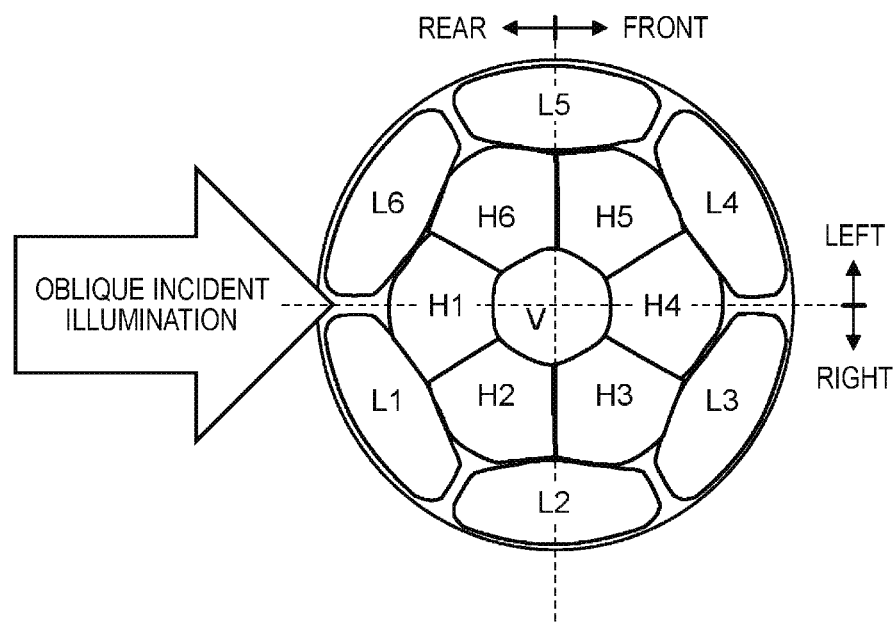

[FIG. 8]
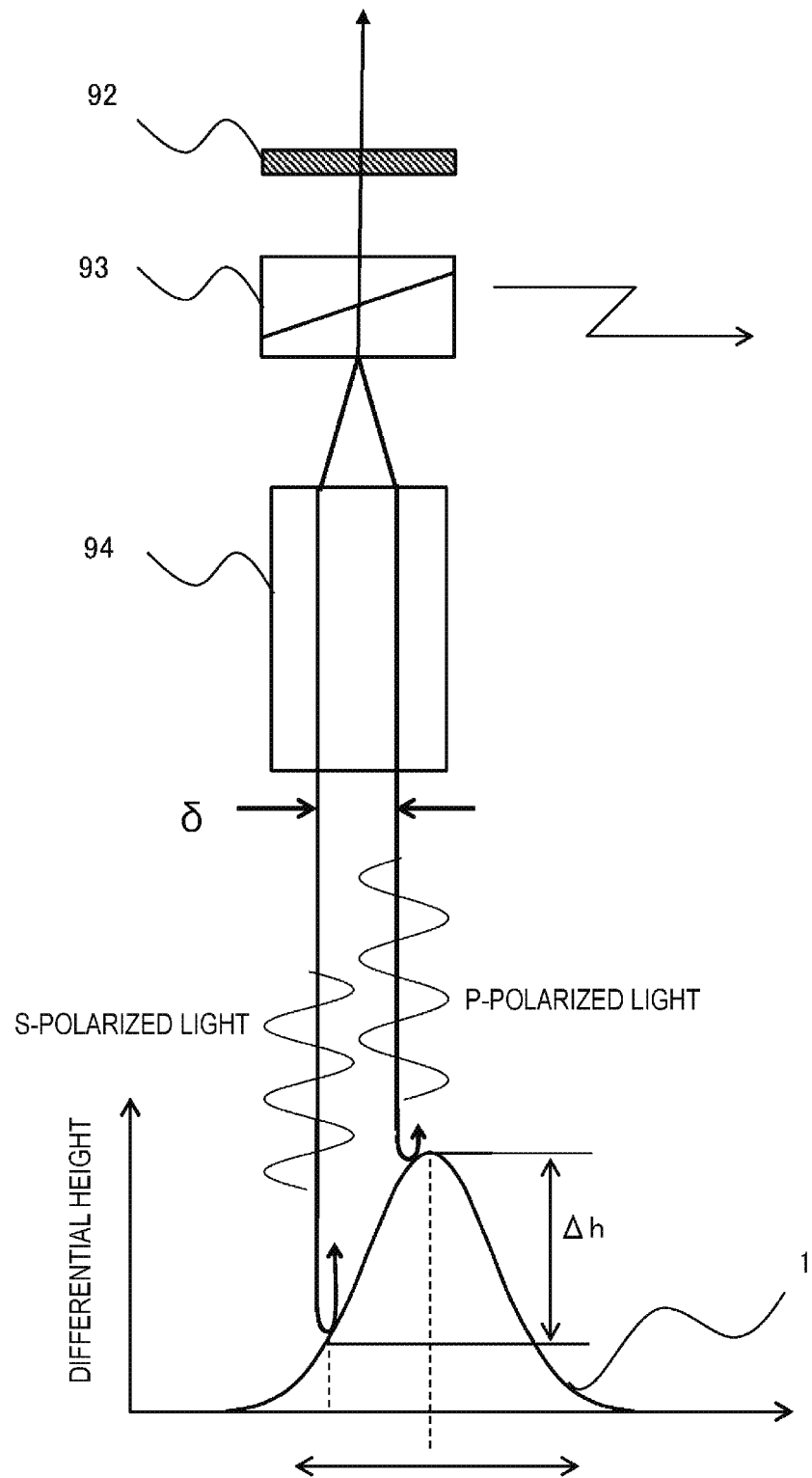

[FIG. 9]
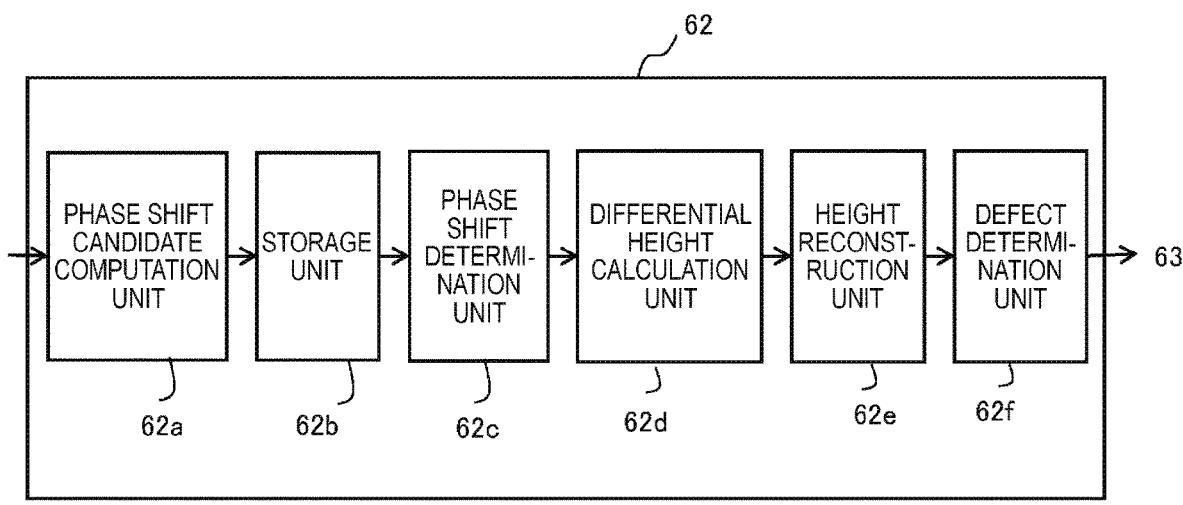

[FIG. 10A]
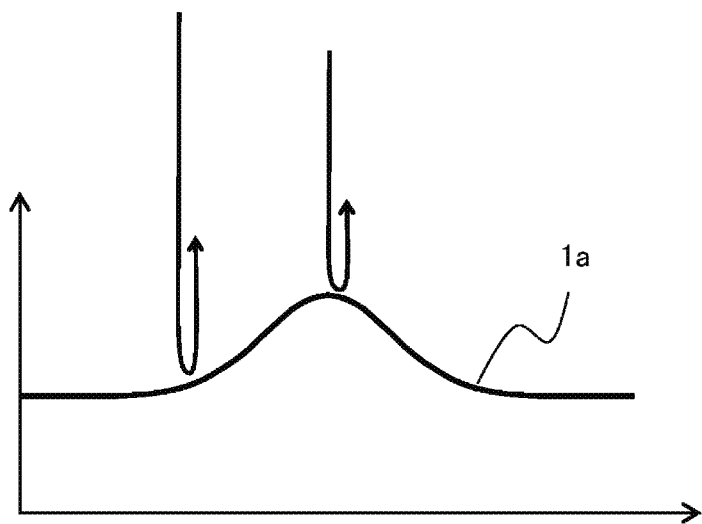
[FIG. 10B]
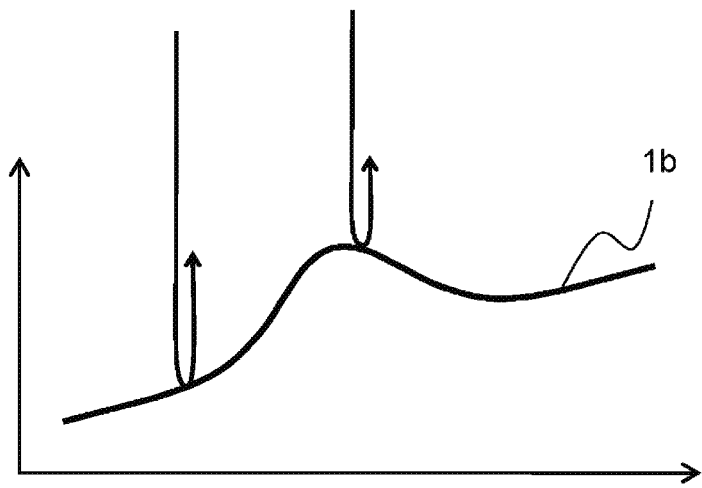

[FIG. 11A]
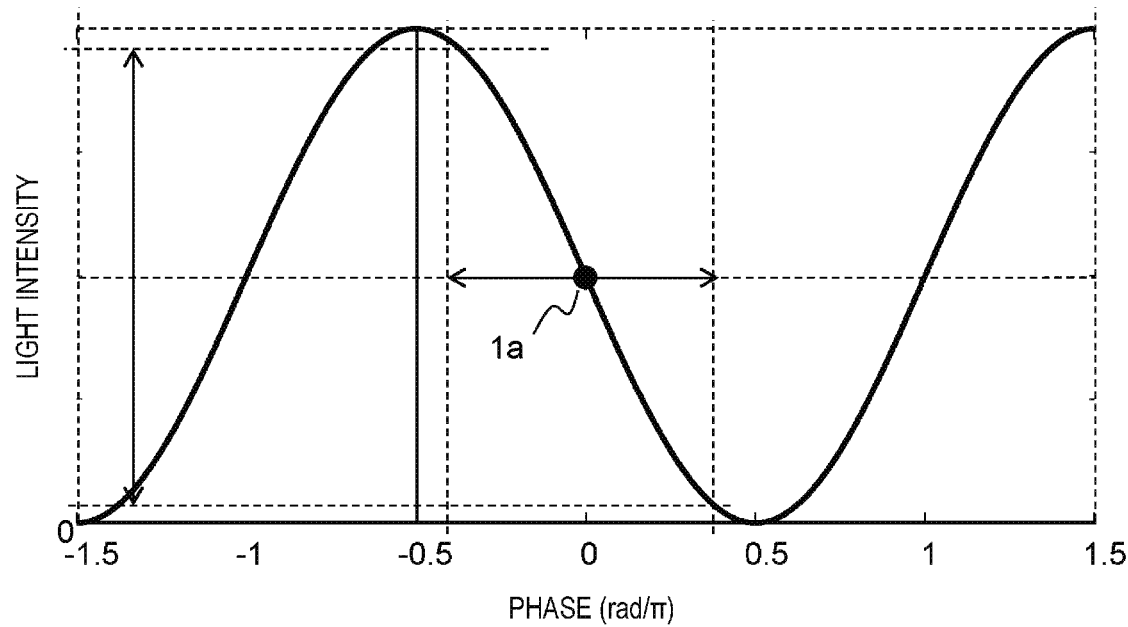
[FIG. 11B]
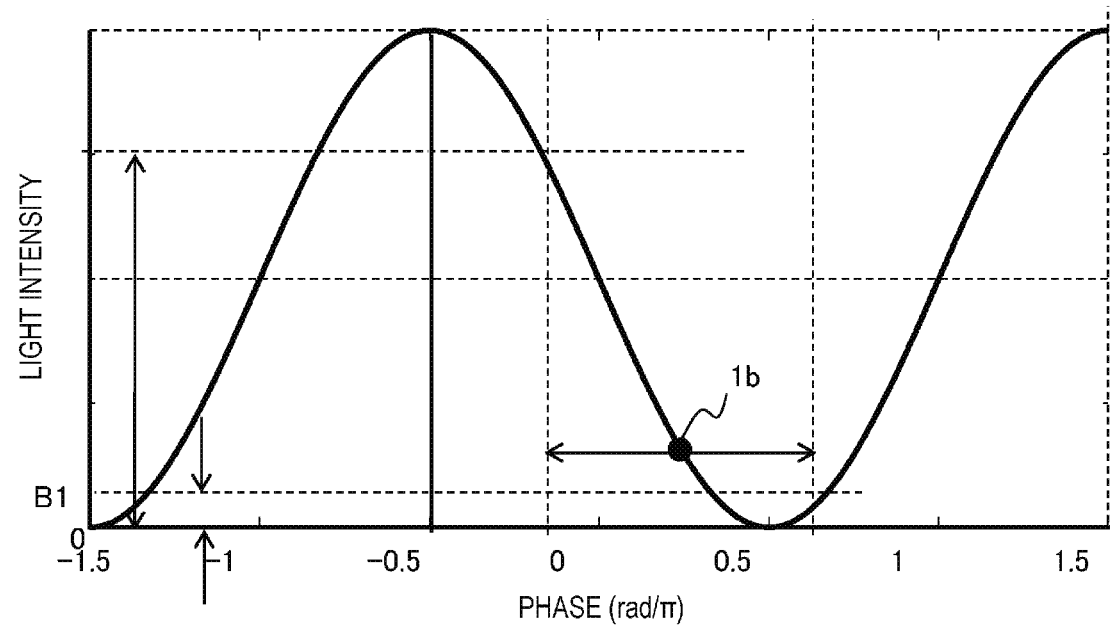

[FIG. 12A]
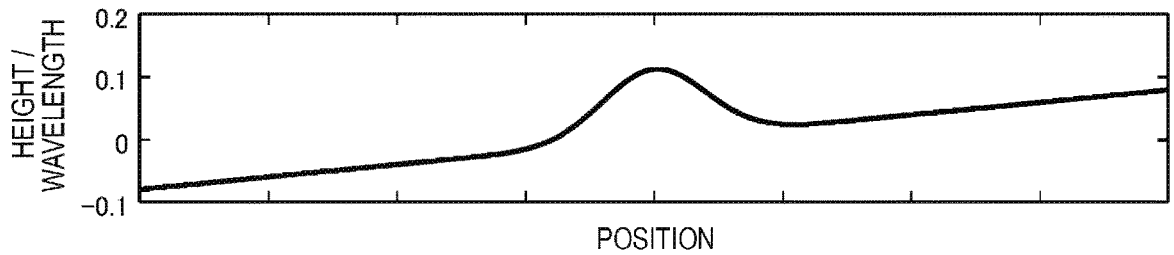
[FIG. 12B]
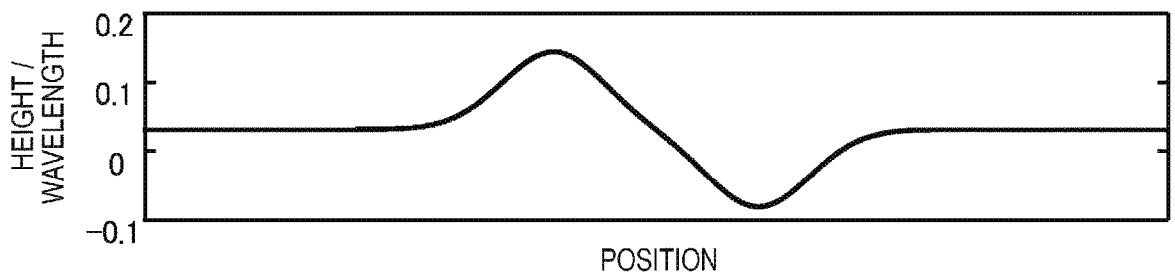
[FIG. 12C]
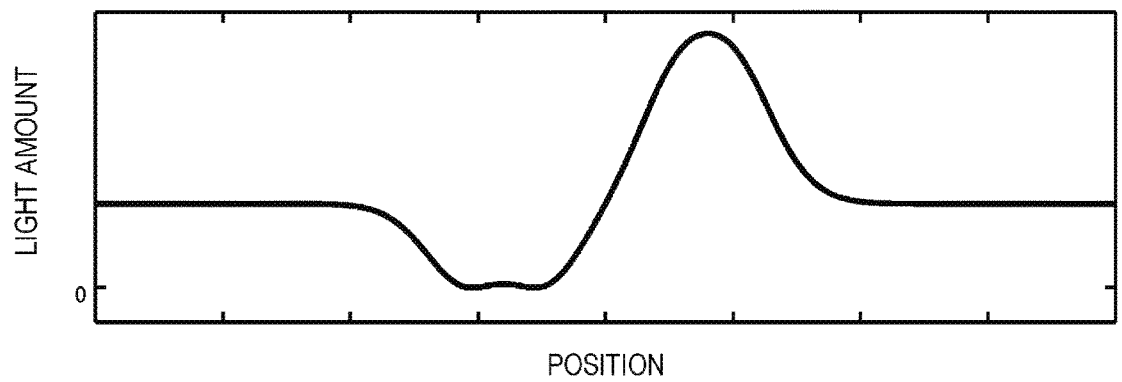
[FIG. 12D]
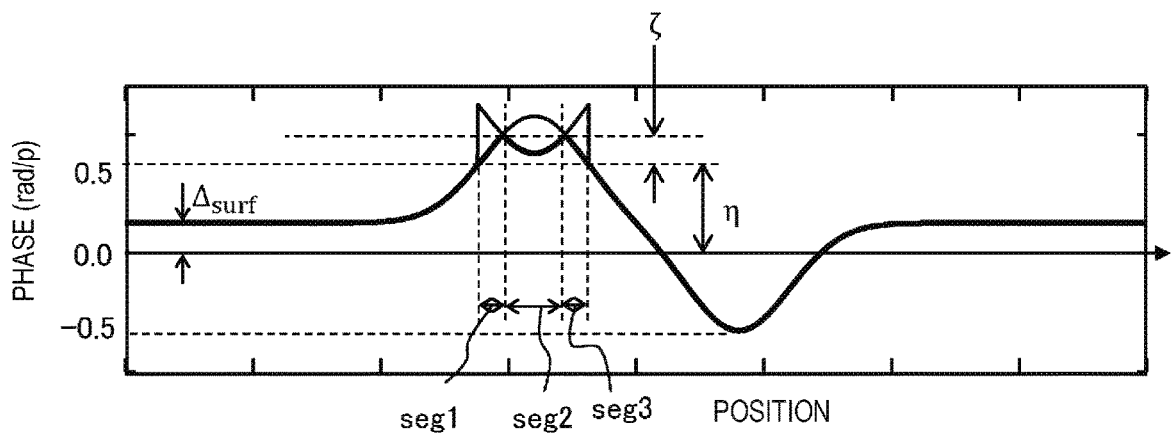

[FIG. 13A]
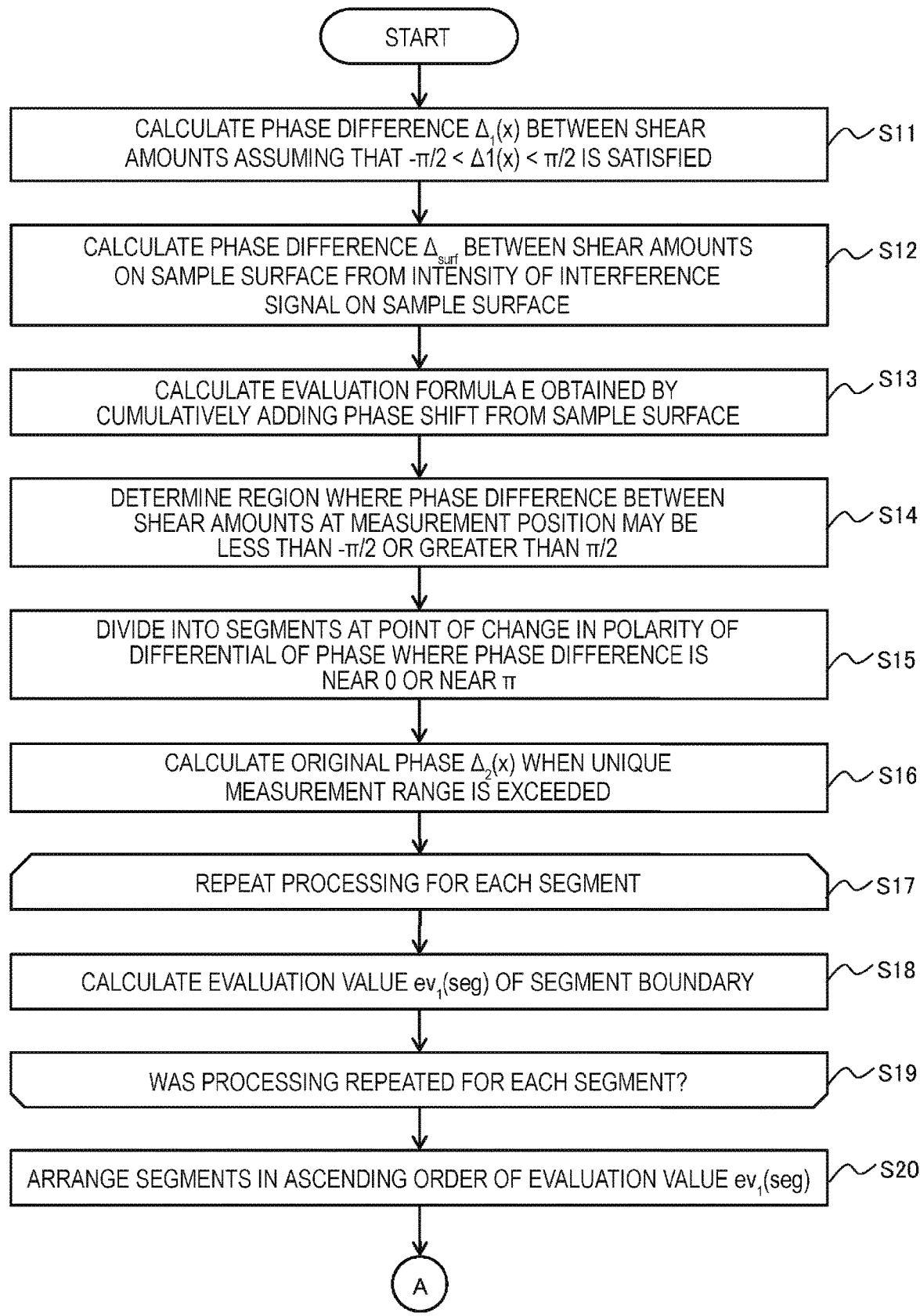

[FIG. 13B]
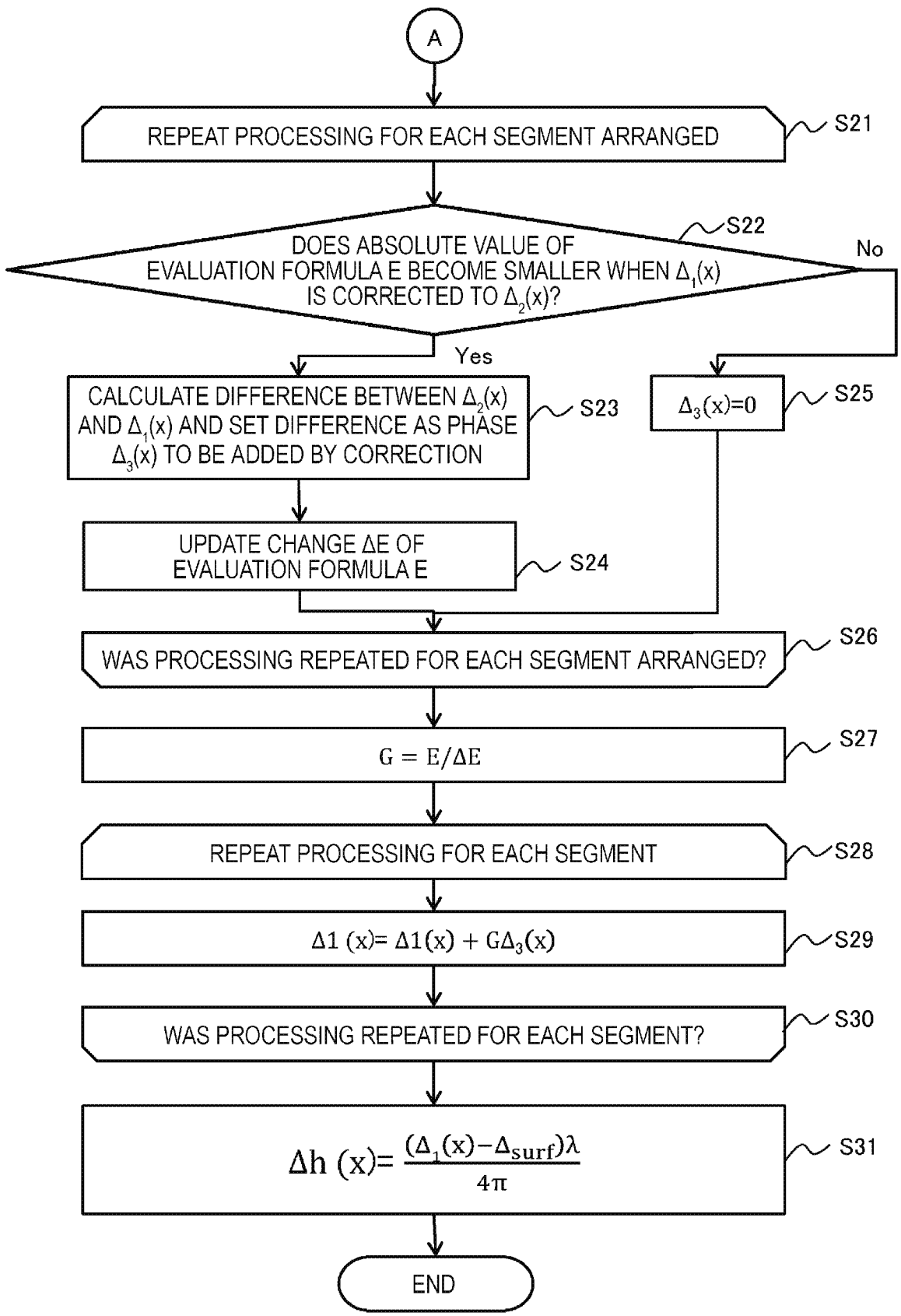

[FIG. 14]
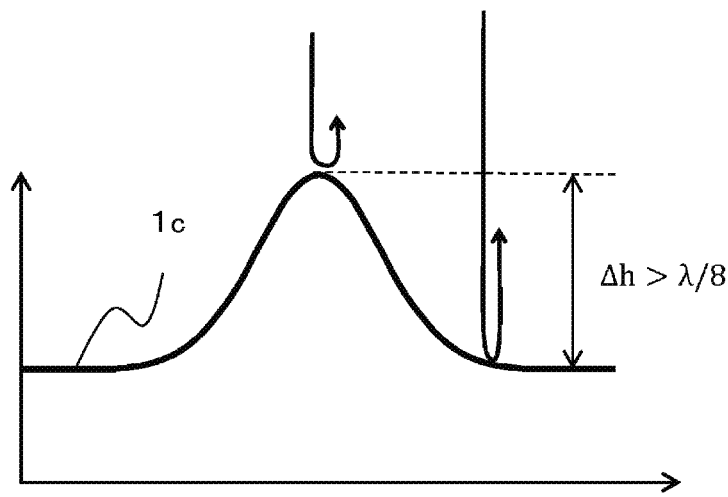
[FIG. 15]
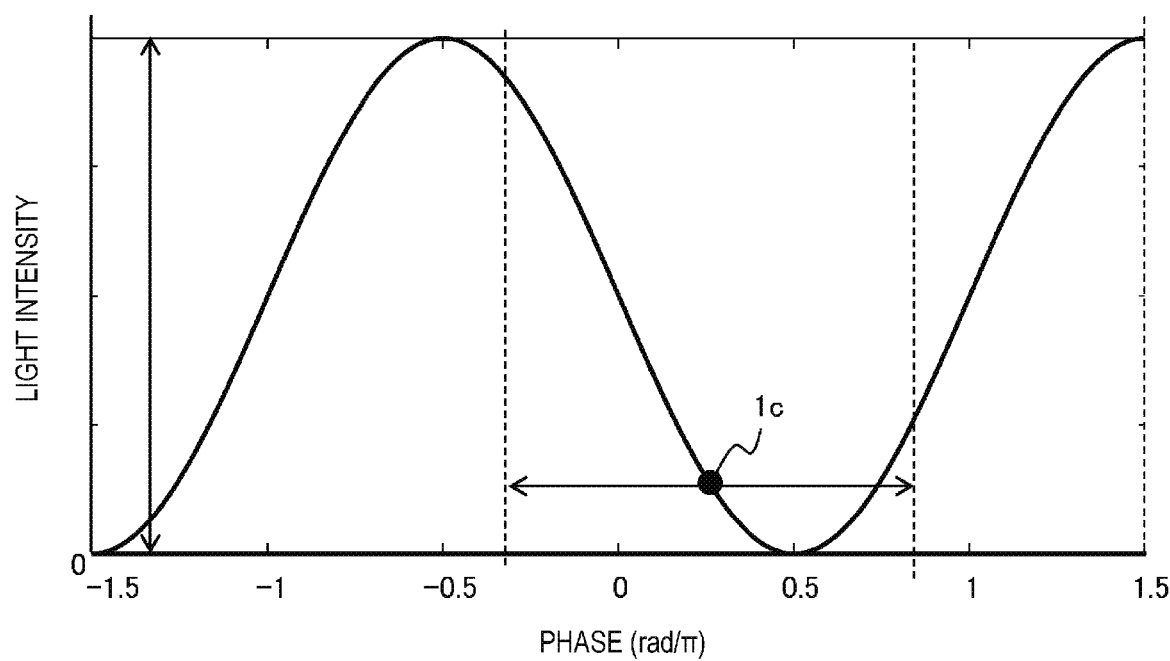

[FIG. 16]
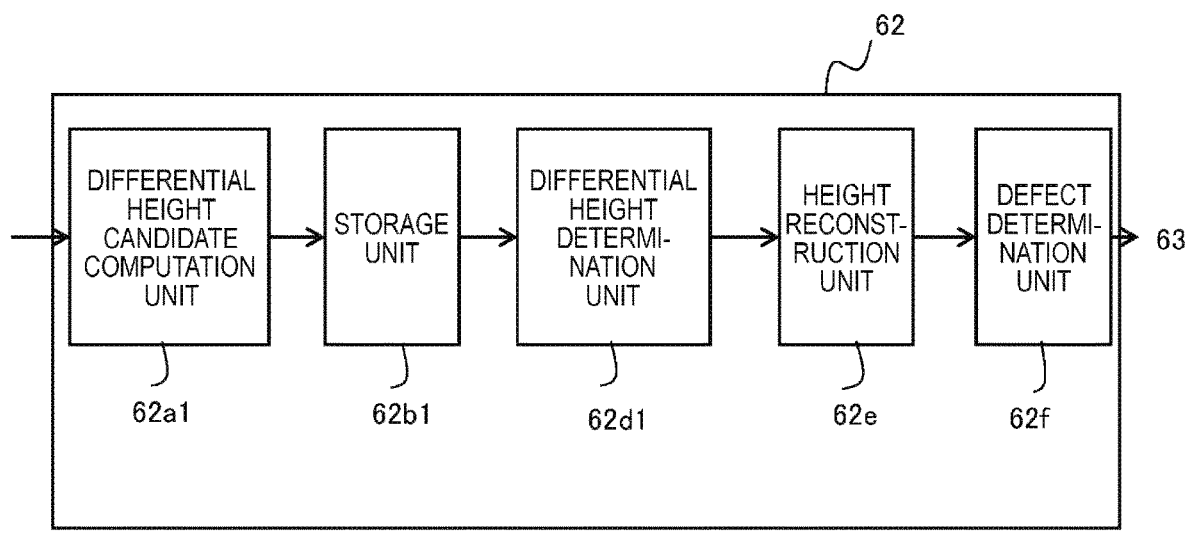

[FIG. 17A]
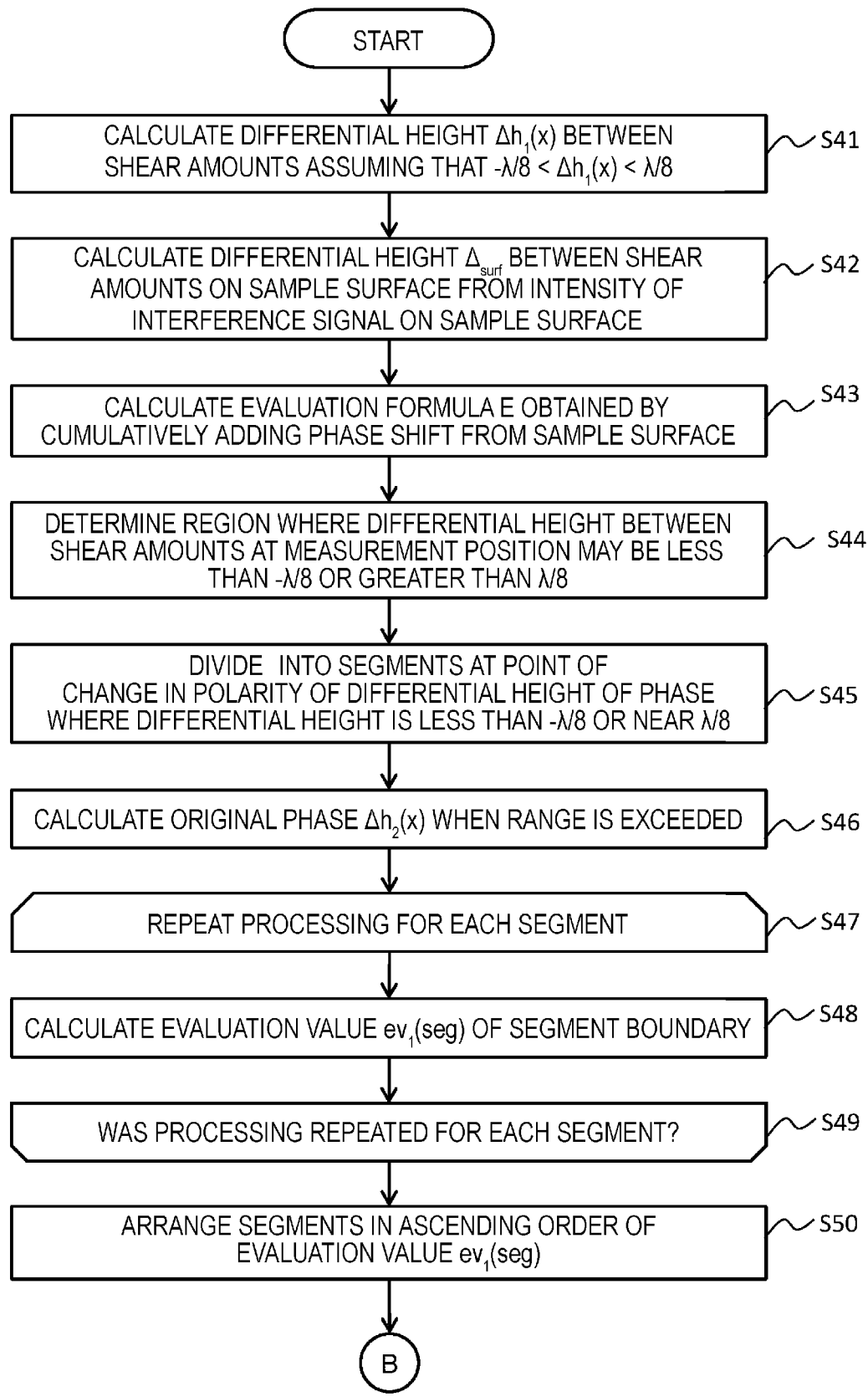

[FIG. 17B]
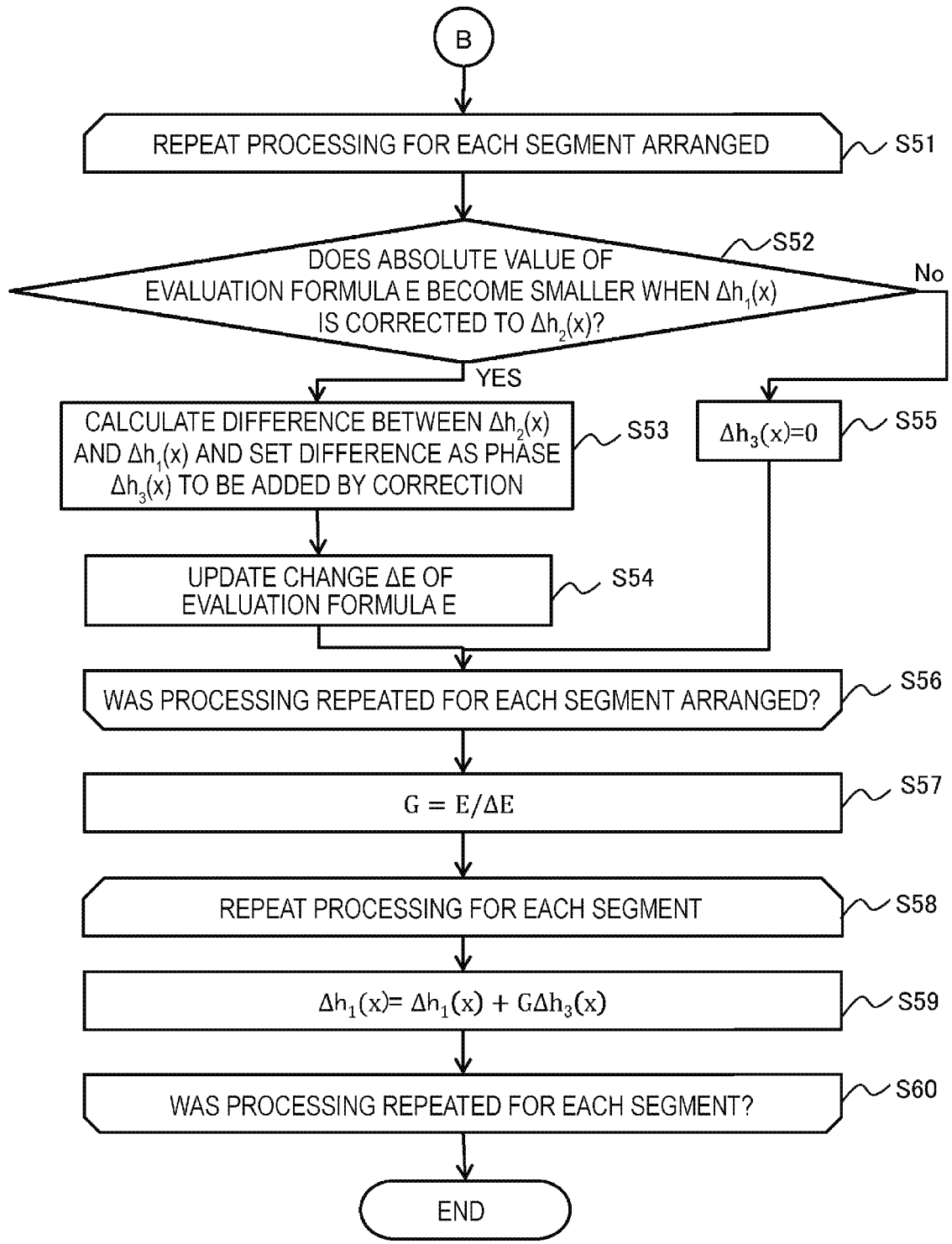

[FIG. 18]
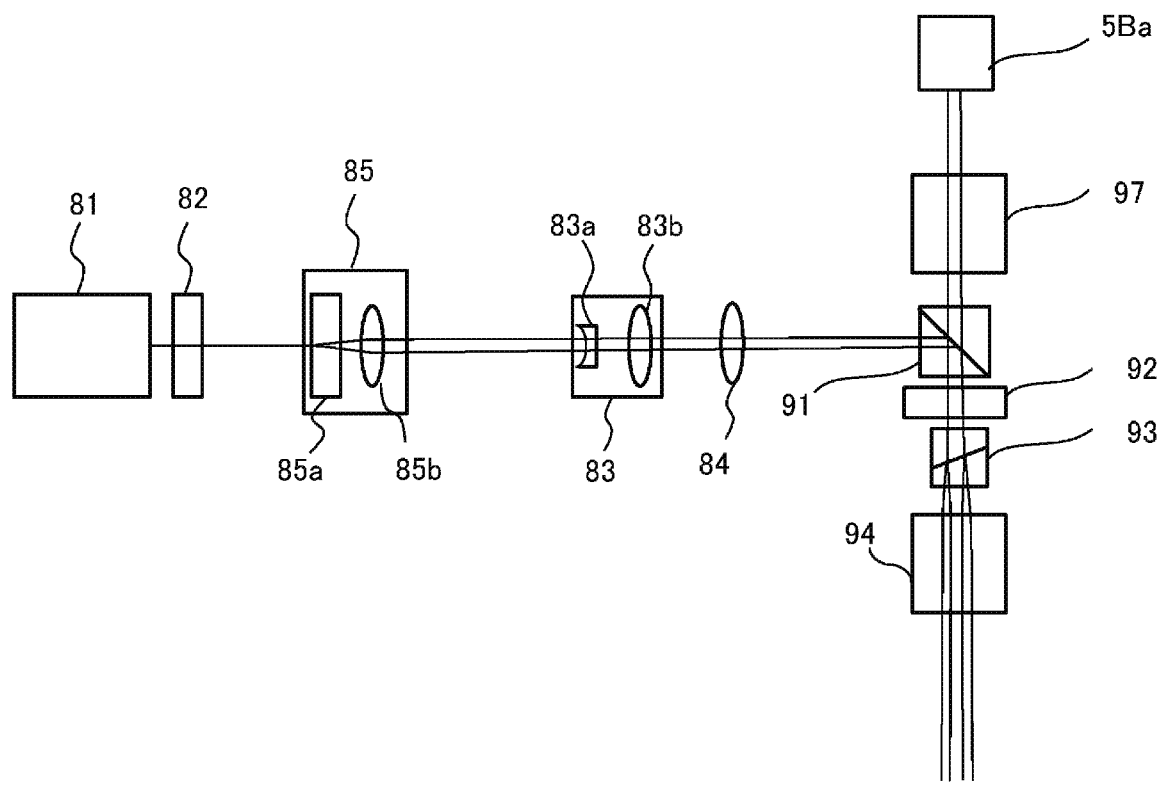
[FIG. 19]
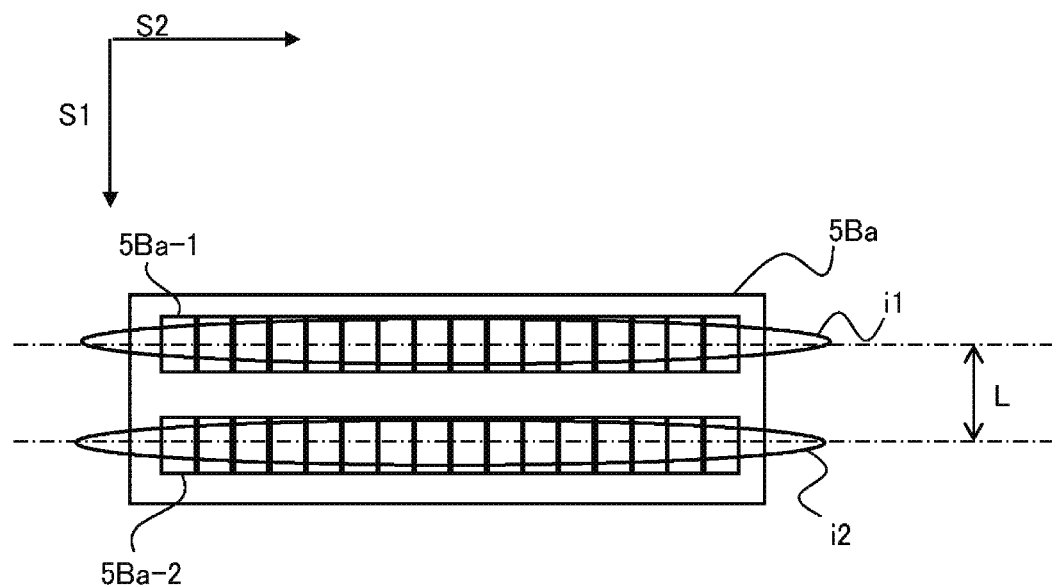

[FIG. 20]
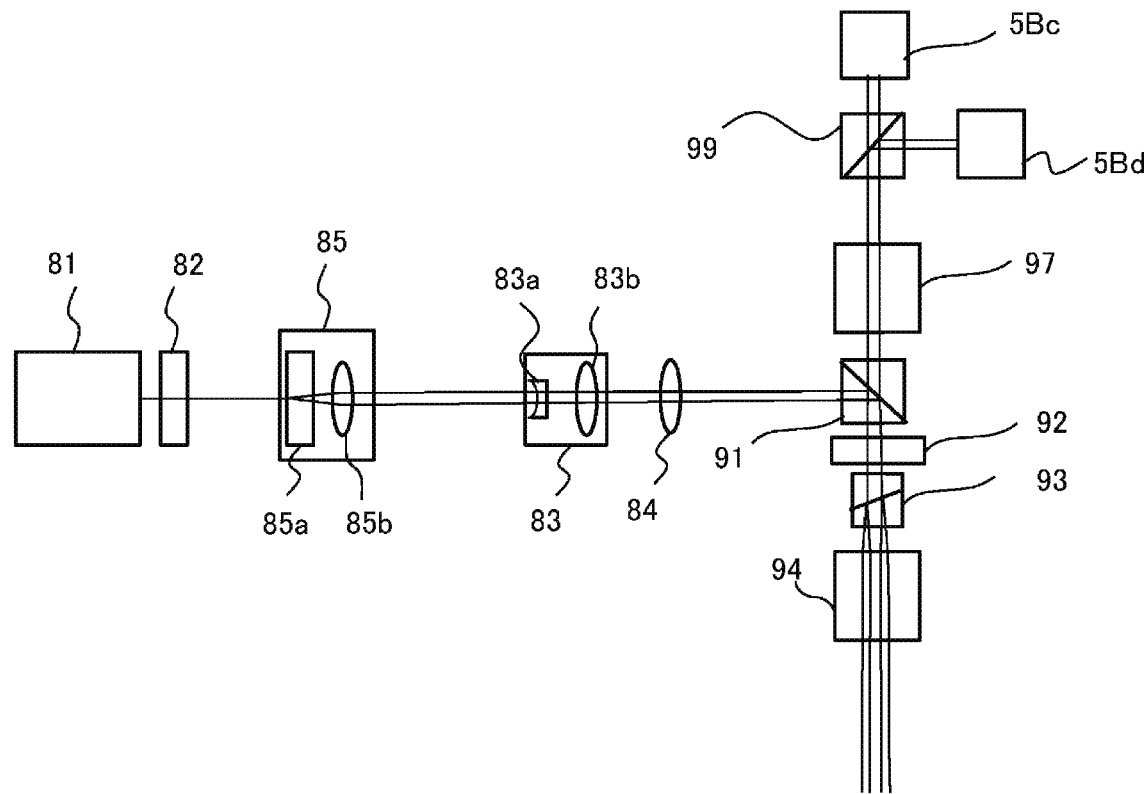
[FIG. 21]
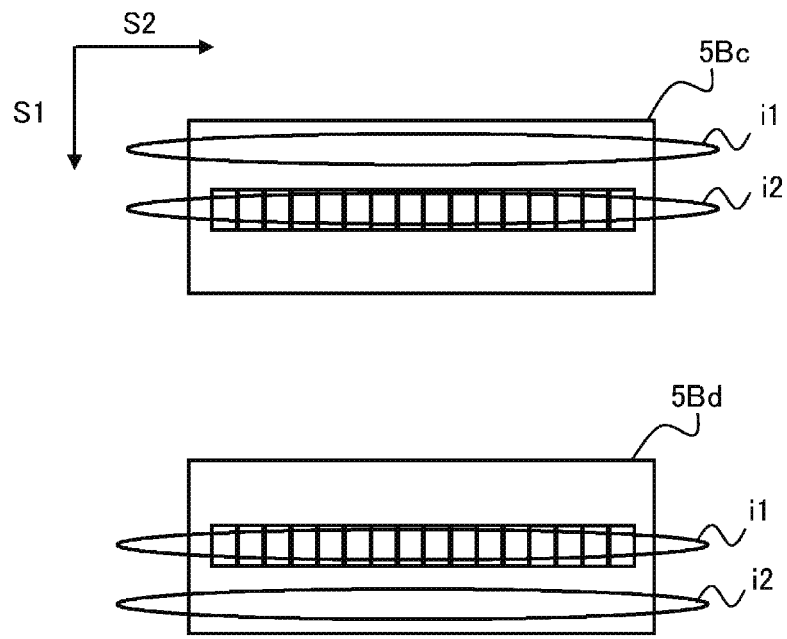

[FIG. 22A]
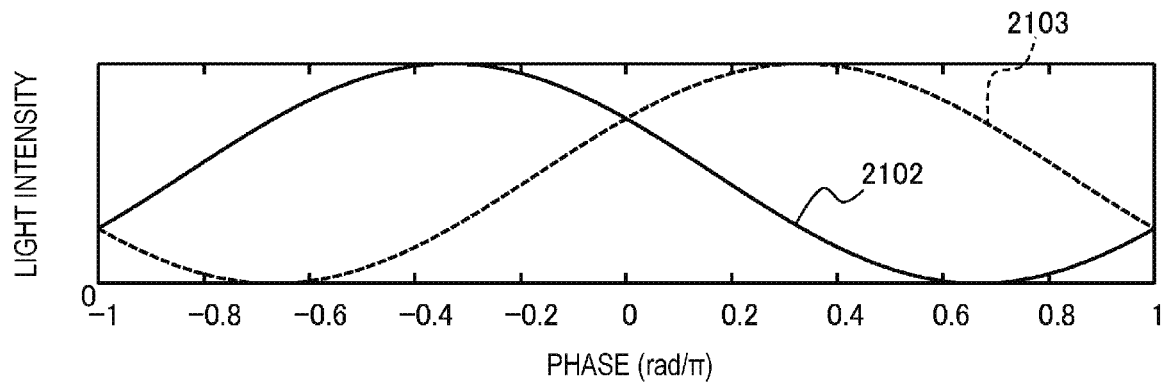
[FIG. 22B]
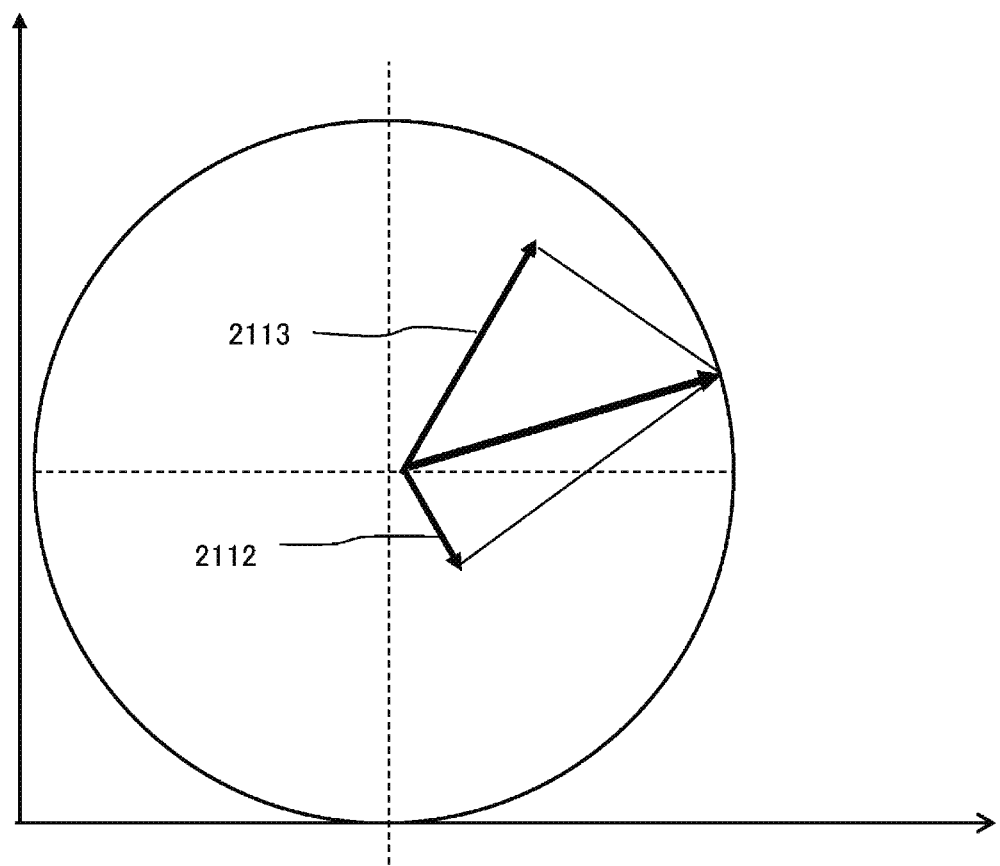

[FIG. 23A]
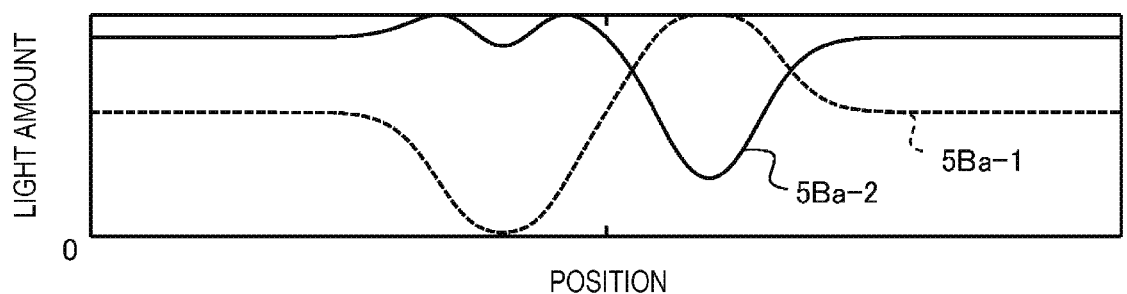
[FIG. 23B]
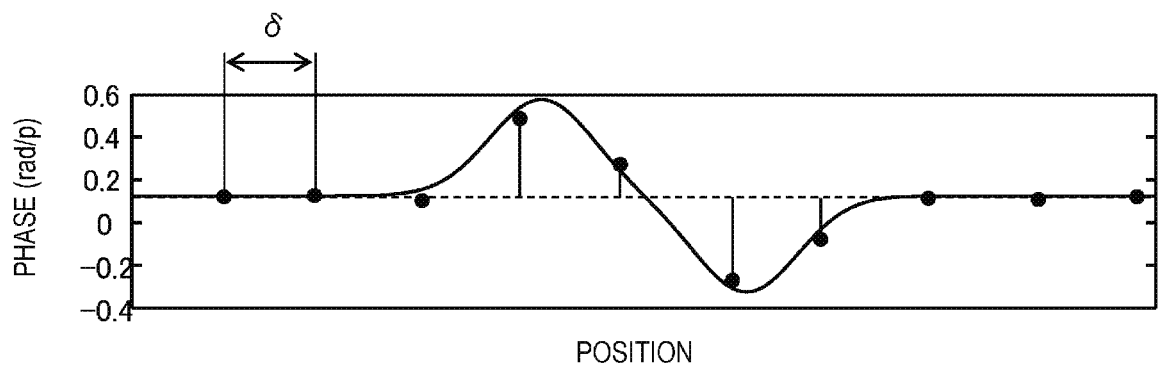

[FIG. 24]
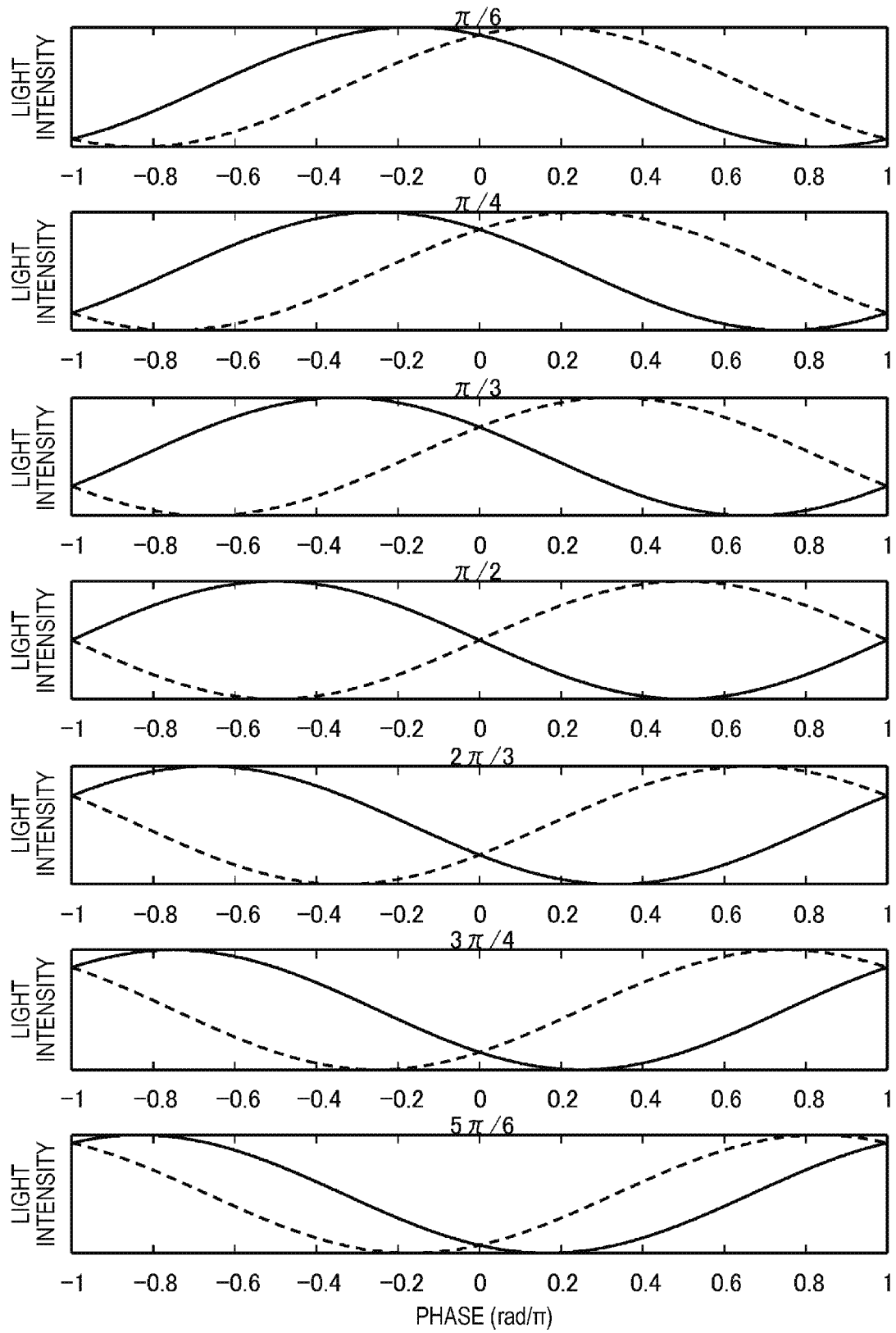

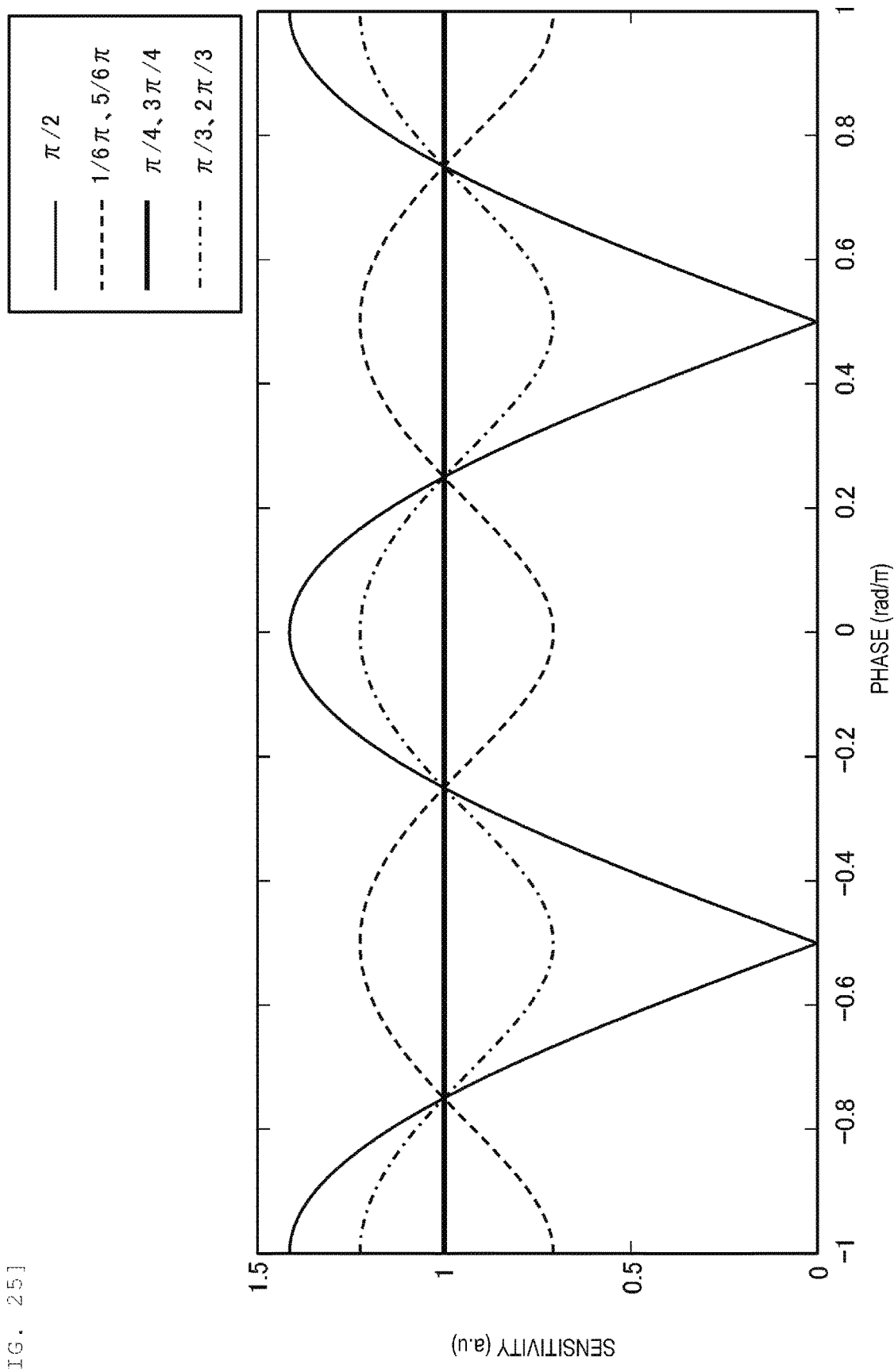
[FIG. 25]

[FIG. 26]
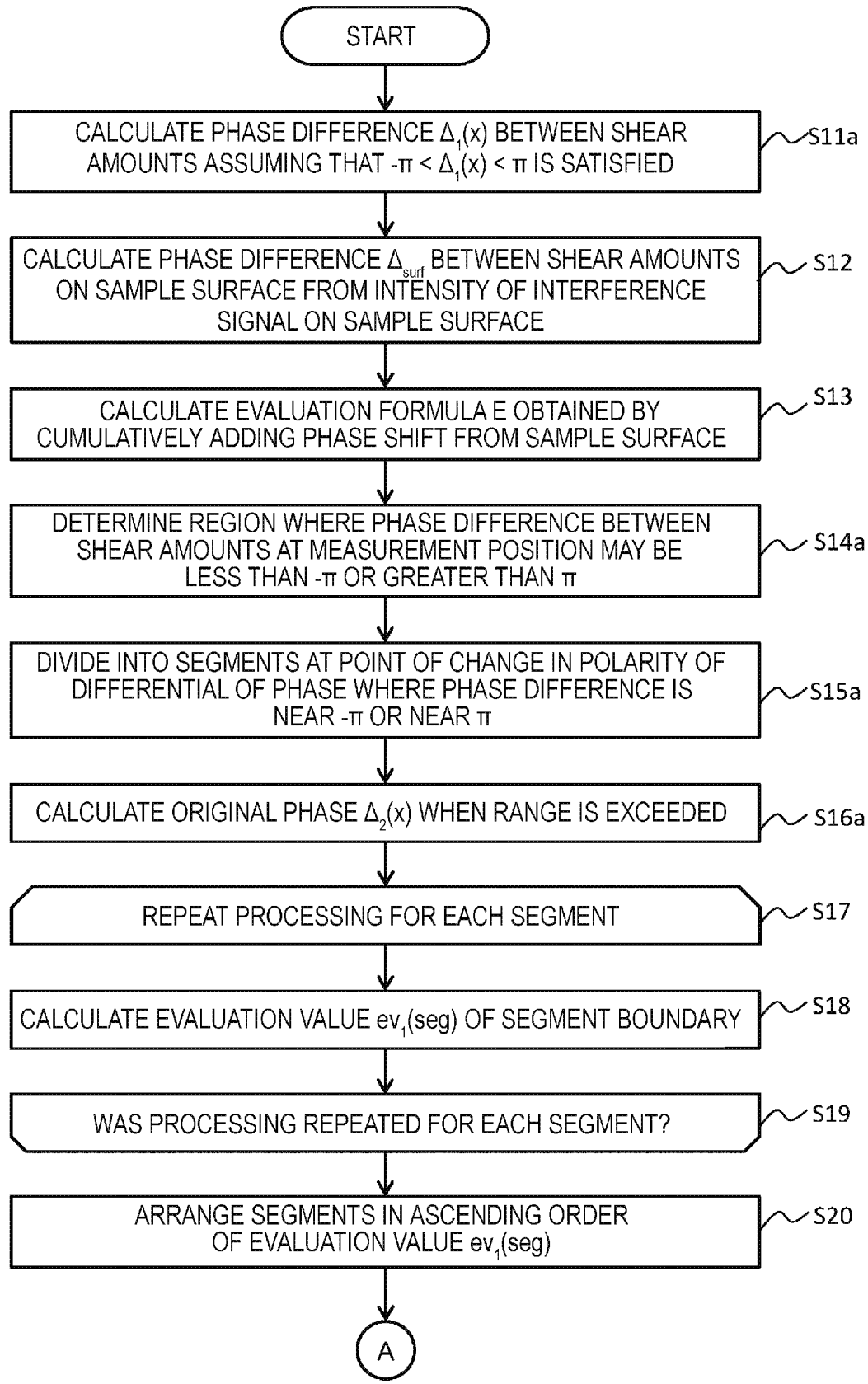

[FIG. 27]
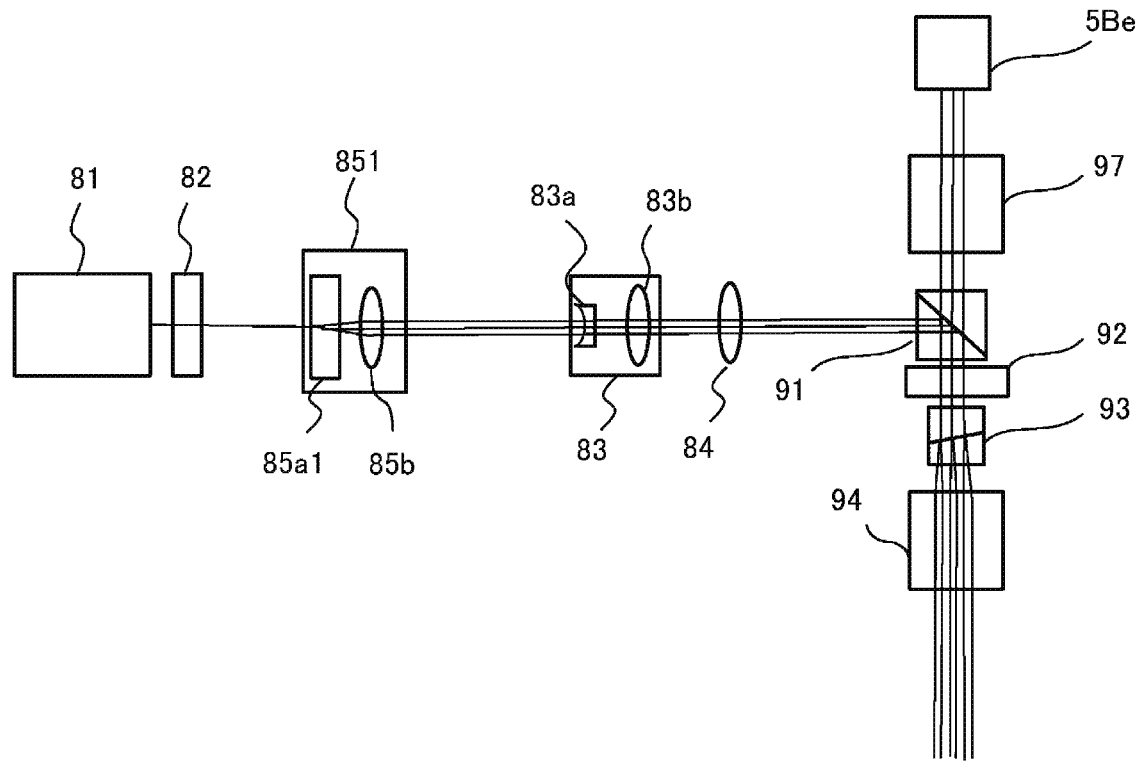
[FIG. 28]
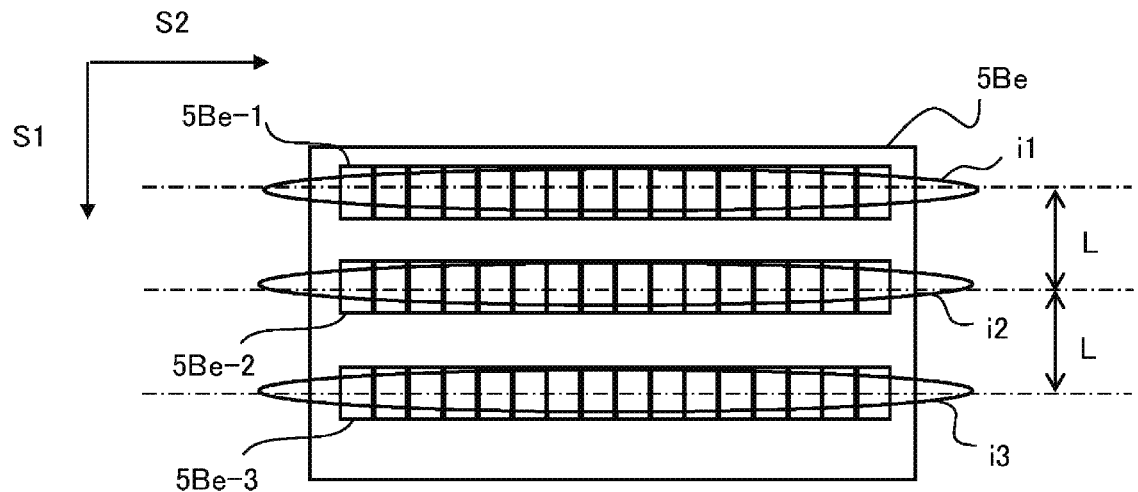

[FIG. 29]
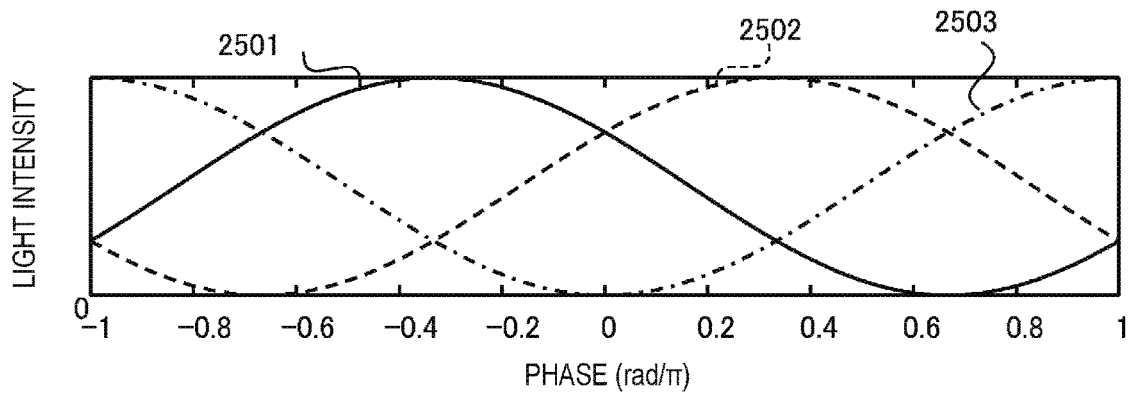
[FIG. 30]
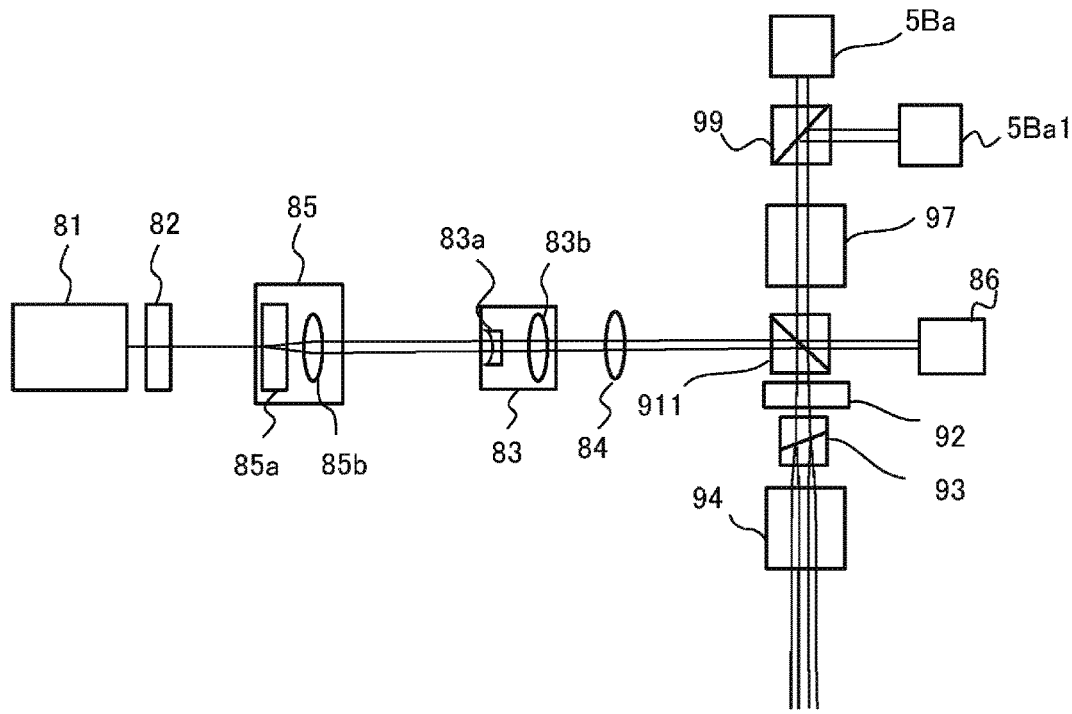
[FIG. 31]
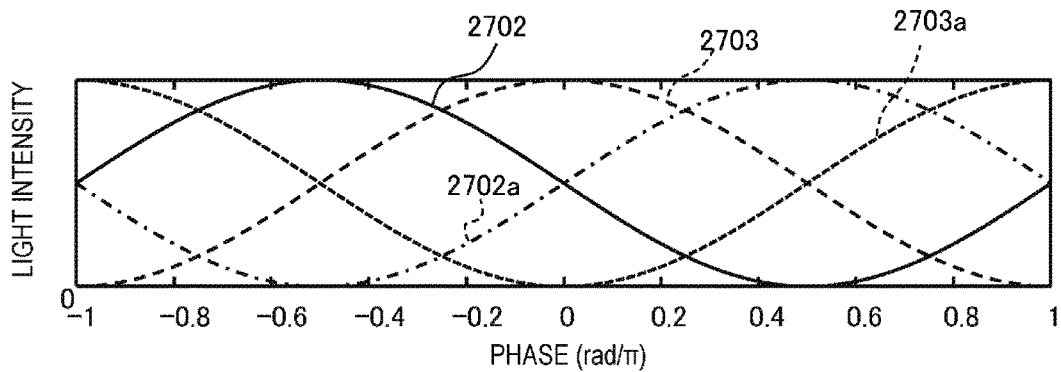

SURFACE INSPECTION DEVICE AND SHAPE MEASUREMENT SOFTWARE

TECHNICAL FIELD

The present invention relates to a surface inspection apparatus and shape measurement software for inspecting a sample surface and outputting position, type, dimension, and the like of a defect.

BACKGROUND ART

In a manufacturing line of a semiconductor substrate, thin film substrate, and the like, a defect of surface of the semiconductor substrate, thin film substrate, and the like is inspected to improve a yield of product. As a defect inspection apparatus used for defect inspection, there is known one that measures a surface shape of the sample surface using differential interference contrast and acquires detailed information about position, shape, size, and the like of the defect (see PTL 1 and the like).

CITATION LIST

Patent Literature

PTL 1: WO2020/208680A

SUMMARY OF INVENTION

Technical Problem

To detect a shape having a smooth surface with high sensitivity in differential interference contrast measurement, a method of increasing a shear amount that indicates a shift of a detection position in different polarization directions on the sample surface or a method of shortening a wavelength used for detection to improve the differential interference contrast are known. However, any of the methods cause a problem of narrowing a height measurable range. In the differential interference contrast measurement, a light amount is changed by generating a phase shift in reflected light based on height displacement between two points on the sample surface, but the phase shift becomes the amount of detected light of the same brightness in the same period as the wavelength. In reflection-type differential interference contrast, in general, only the height displacement in a section corresponding to ¼ of the wavelength can be detected. If the shear amount is increased, the height displacement increases when a surface shape changes gently, and there is a high risk of exceeding the height measurable range. Even if the wavelength is shortened, the height measurable range is still narrowed.

An object of the present invention is to provide a measurement method to achieve both high sensitivity and robustness of a defect inspection apparatus.

Accordingly, a problem to be solved by the present invention is to expand the height measurement range that is narrowed when height measurement accuracy is improved by increasing the shear amount and shortening the wavelength in a surface inspection apparatus and shape measurement software.

Solution to Problem

To achieve the above object, a surface inspection apparatus of the present invention includes a differential interference contrast illumination system that irradiates a sample surface with an illumination spot set, which is composed of two polarized illumination spots that have different phases at a predetermined wavelength and that are offset by a predetermined shear amount, a differential interference contrast detection system that condenses reflected light beams of the two polarized illumination spots reflected from the sample surface to generate interference light beams, a scanning unit that scans the sample surface using the two polarized illumination spots, a sensor unit that photoelectrically converts the interference light beams generated by the differential interference contrast detection system to generate interference signals, a height displacement measurement unit that processes the interference signals to measure height displacement between the two polarized illumination spots, and a height shape reconstruction unit that accumulates height displacement data of the two polarized illumination spots and reconstructs a height shape of the sample surface. The height shape restoration unit reconstructs a height shape of the sample surface by correcting the height displacement data, which is a phase shift exceeding a unique measurement range uniquely measurable with a specific illumination spot set, so that a cumulative addition of a phase shift from the sample surface obtained by subtracting a phase shift corresponding to an inclination of the sample surface from a phase shift in a shear amount direction approaches 0 except for an isolated defect part.

Shape measurement software of the present invention causes a computer to execute a procedure for temporarily determining phase shift of reflected light between two points separated by a shear amount on a sample surface from differential interference contrast images of the sample surface, a procedure for storing the phase shift of the reflected light between the two points in a memory, a procedure for measuring a phase shift due to an inclination of the sample surface from a low frequency component of a shift amount of phase in a shift direction of a shear amount stored in the memory, a procedure for calculating a corrected phase shift by specifying data of which temporarily determined phase shift exceeds a unique measurement range from a light amount for which the phase shift of the reflected light in a shear amount direction stored in the memory is near an integral multiple of $\pi$ [rad], and a procedure for measuring a height shape of the sample surface by accumulating differences between the corrected phase shift and the phase shift of the sample surface at points separated by the shear amount.

Other means are described in the embodiments of the invention.

Advantageous Effects of Invention

According to the present invention, it is possible to expand the height measurement range, which is narrowed when height measurement accuracy is improved by increasing the shear amount and shortening the wavelength, in the surface inspection apparatus and the shape measurement software.

BRIEF DESCRIPTION OF DRAWINGS

FIG. 1 is a schematic diagram of a configuration example of a defect inspection apparatus according to a first embodiment of the present invention.

FIG. 2 is a schematic diagram illustrating an example of a scanning trajectory of a sample by a scanning device.

FIG. 3 is a schematic diagram illustrating another example of the scanning trajectory of the sample by the scanning device.

FIG. 4 is a schematic diagram illustrating an extracted attenuator.

FIG. 5 is a diagram schematically illustrating a positional relationship between an optical axis of illumination light directed obliquely to a surface of the sample by an illumination optical system and an illumination intensity distribution shape with a cross section obtained by cutting the sample along an incident plane of the illumination light incident on the sample.

FIG. 6 is a diagram schematically illustrating the positional relationship between the optical axis of the illumination light directed obliquely to the surface of the sample by the illumination optical system and the illumination intensity distribution shape with a cross section obtained by cutting the sample along a plane that is orthogonal to the incident plane of the illumination light incident on the sample and including a normal line to the surface of the sample.

FIG. 7 is a top view illustrating a region where a detection optical system collects scattered light.

FIG. 8 is a schematic diagram for illustrating polarization separation of a Nomarski prism.

FIG. 9 is a block diagram of a differential interference contrast data processing unit.

FIG. 10A is an explanatory diagram of a flat sample surface.

FIG. 10B is an explanatory diagram of an inclined sample surface.

FIG. 11A is a graph illustrating a relationship between light intensity and phase on the flat sample surface.

FIG. 11B is a graph illustrating the relationship between light intensity and phase on the inclined sample surface.

FIG. 12A is a graph illustrating a relationship between sample surface height/wavelength and position.

FIG. 12B is a graph illustrating the relationship between sample surface height/wavelength and position.

FIG. 12C is a graph illustrating a relationship between light amount and position.

FIG. 12D is a graph illustrating a relationship between phase and position.

FIG. 13A is a flowchart of data processing in differential interference contrast detection.

FIG. 13B is a flowchart of the data processing in the differential interference contrast detection.

FIG. 14 is a conceptual diagram of height displacement exceeding a unique measurement range in the differential interference contrast detection.

FIG. 15 is a graph illustrating a light intensity change range due to the height displacement exceeding the unique measurement range.

FIG. 16 is a block diagram of a modification of the differential interference contrast data processing unit.

FIG. 17A is a flowchart illustrating data processing in differential interference contrast detection according to the modification.

FIG. 17B is a flowchart illustrating the data processing in the differential interference contrast detection according to the modification.

FIG. 18 is a schematic diagram of a differential interference contrast detection system according to a second embodiment of the present invention.

FIG. 19 is a schematic diagram of a light receiving portion of a differential interference contrast sensor.

FIG. 20 is a schematic diagram of a differential interference contrast detection system according to a modification of the second embodiment.

FIG. 21 is a schematic diagram of the light receiving portion of the differential interference contrast sensor.

FIG. 22A is a graph illustrating a correspondence between phase expression of height displacement and light intensity of interference light by differential interference contrast.

FIG. 22B is a vector space representation of phase and light intensity.

FIG. 23A is a graph illustrating a change in a light amount at a stepped portion.

FIG. 23B is a graph illustrating a phase at the stepped portion.

FIG. 24 is a graph illustrating a correspondence between phase expression of height displacement with respect to height displacement and light intensity of interference light by differential interference contrast, which is illustrated for each difference in phase difference between illumination spots belonging to each of two illumination spot sets in differential interference contrast detection according to the second embodiment of the present invention.

FIG. 25 is a graph illustrating an expected measurement accuracy of height displacement in the differential interference contrast detection according to the second embodiment of the present invention for each difference in the phase difference between the illumination spots belonging to each of the two illumination spot sets.

FIG. 26 is a flowchart illustrating data processing in the differential interference contrast detection according to the second embodiment of the present invention.

FIG. 27 is a schematic diagram of a differential interference contrast detection system according to a third embodiment of the present invention.

FIG. 28 is a schematic diagram of a light receiving portion of a sensor.

FIG. 29 is a graph illustrating a correspondence between phase expression of height displacement and light intensity of interference light by differential interference contrast.

FIG. 30 is a schematic diagram of a differential interference contrast detection system according to a fourth embodiment of the present invention.

FIG. 31 is a graph illustrating a correspondence between phase expression of height displacement and light intensity of interference light by differential interference contrast.

DESCRIPTION OF EMBODIMENTS

Embodiments of the present invention will be described below with reference to the respective drawings.

A defect inspection apparatus, which will be described as an application target of the present invention in the following embodiments, is used for defect inspection of a surface of a sample (wafer) performed during a manufacturing process of a semiconductor, for example. The defect inspection apparatus according to each embodiment is suitable for executing a process of detecting minute defects and acquiring data about number, position, dimension, and type of defects at high speed.

First Embodiment

FIG. 1 is a schematic diagram of a configuration example of a defect inspection apparatus 100 according to the first embodiment.

The defect inspection apparatus 100 according to the embodiment is a surface inspection apparatus which uses a sample 1 as an inspection target and detects defects such as foreign matter and dents on a surface of the sample 1, particularly types of defects according to an inspection purpose. As the sample 1, a disk-shaped semiconductor silicon wafer having a flat surface on which no pattern is formed is assumed as a representative example. The defect inspection apparatus 100 includes a stage ST, a dark field illumination optical system 3, a plurality of detection optical systems 4v, 4-1, 4-2, ..., dark field detection sensors 5v, 5-1, 5-2, ..., a line sensor 5B, a differential interference contrast illumination system 8, a differential interference contrast detection system 9, a signal processing device 6, a control device 71, a user interface 72, and a monitor 73.

«Stage ST»

The stage ST illustrated in FIG. 1 is configured to include a sample table ST1 and a scanning device ST2. The sample table ST1 is a table for supporting the sample 1. The scanning device ST2 is a device that drives the sample table ST1 to change relative positions of the sample 1, the dark field illumination optical system 3, and the differential interference contrast illumination system 8. Although not illustrated in detail, the scanning device ST2 is configured to include a translation stage, a rotation stage, and a Z stage. The device is configured such that the rotation stage is supported by the translation stage via the Z stage, and the sample table ST1 is supported by the rotation stage. The translation stage horizontally translates together with the rotation stage, and the rotation stage rotates around an axis extending vertically. The Z stage functions to adjust a height of a surface of the sample 1.

FIG. 2 is a schematic diagram illustrating a scanning trajectory of the sample 1 by the scanning device ST2.

The scanning device ST2 is a scanning unit that scans the surface of the sample 1 with two polarized illumination spots. As will be described later, an illumination spot 40 irradiated on the surface of the sample 1 by illumination light emitted from the dark field illumination optical system 3 has an illumination intensity distribution that is long in one direction as illustrated in FIG. 2. The long axis direction of the illumination spot 40 is defined as a direction s2, and a direction crossing the long axis (for example, short axis direction orthogonal to long axis) is defined as a direction s1. As the rotation stage rotates, the sample 1 rotates and the illumination spot 40 is scanned in the direction s1 relative to the surface of the sample 1, and as the translation stage translates, the sample 1 moves in the horizontal direction and the illumination spot 40 is scanned in the direction s2 relative to the surface of the sample 1. As the sample 1 moves while rotating due to an operation of the scanning device ST2, the illumination spot 40 moves in a spiral locus from the center to an outer edge of the sample 1 to scan the entire surface of the sample 1, as illustrated in FIG. 2. The illumination spot 40 moves in the direction s2 by a distance less than or equal to a length of the illumination spot 40 in the direction s2 during one revolution of the sample 1. The same applies to an illumination spot formed by the differential interference contrast illumination system 8.

It is also possible to apply a scanning device having a configuration in which, in place of the rotation stage, another translation stage having a movement axis extending in a direction crossing a movement axis of the translation stage in a horizontal plane is provided. Here, as illustrated in FIG. 3 to be described later, the illumination spot 40 scans the surface of the sample 1 by folding a linear trajectory instead of the spiral trajectory. Specifically, a first translation stage is translated and driven in the direction s1 at a constant speed, a second translation stage is driven in the direction s2 by a predetermined distance (for example, a distance equal to or less than the length of the illumination spot 40 in the direction s2), and then the first translation stage is folded back again in the direction s1 to be translated and driven. Accordingly, the illumination spot 40 scans the entire surface of the sample 1 by repeating linear scanning in the direction s1 and movement in the direction s2. Compared to the linear scanning method, the spiral scanning method illustrated in FIG. 2 does not involve reciprocating motion, and thus the spiral scanning method is advantageous in inspecting the sample 1 in a short period of time.

«Dark Field Illumination Optical System 3»

The dark field illumination optical system 3 illustrated in FIG. 1 is configured to include an optical element group for irradiating the sample 1 placed on the sample table ST1 with desired illumination light. The dark field illumination optical system 3 includes a laser light source 31, an attenuator 32, an emitted light adjustment unit 33, a beam expander 34, a polarization control unit 35, a condensing optical unit 36, reflecting mirrors 37 and 38, and the like.

«Laser Light Source 31»

The laser light source 31 is a unit that emits a laser beam as illumination light. When the defect inspection apparatus 100 detects a minute defect near the surface of the sample 1, a laser light source that oscillates a high-output laser beam with an output of 2 W or more using ultraviolet rays or vacuum ultraviolet rays having a short wavelength (wavelength of 355 nm or less) that are difficult to penetrate into the sample 1 is used as the laser light source 31. The diameter of the laser beam emitted by the laser light source 31 is typically about 1 mm. When the defect inspection apparatus 100 detects the defect inside the sample 1, a laser light source that oscillates a laser beam of visible light or infrared light that has a long wavelength and easily penetrates the inside of the sample 1 is used as the laser light source 31.

«Attenuator 32»

FIG. 4 is a schematic diagram illustrating the attenuator 32 extracted from the dark field illumination optical system 3.

As illustrated in FIG. 4, a configuration in which the attenuator 32 of the embodiment is obtained by combining a first polarizing plate 32a, a half-wave plate 32b, and a second polarizing plate 32c is exemplified. The attenuator 32 is a unit that attenuates light intensity of illumination light from the laser light source 31.

The half-wave plate 32b is configured to be rotatable around an optical axis of the illumination light. The illumination light incident on the attenuator 32 is converted into linearly polarized light by the first polarizing plate 32a, and then passes through the second polarizing plate 32c with the polarization direction of the illumination light adjusted to a slow axis azimuth angle of the half-wave plate 32b. By adjusting the azimuth angle of the half-wave plate 32b, light intensity of the illumination light can be attenuated at an arbitrary ratio. If the degree of linear polarization of the illumination light incident on the attenuator 32 is sufficiently high, the first polarizing plate 32a can be omitted. The attenuator 32 is not limited to the configuration illustrated in FIG. 4, and can be configured using an ND filter having a gradation density distribution, or can be configured such that an attenuation effect can be adjusted by combining a plurality of ND filters having different densities.

«Emitted Light Adjustment Unit 33»

The emitted light adjustment unit 33 illustrated in FIG. 1 is a unit that adjusts an angle of an optical axis of the illumination light attenuated by the attenuator 32, and is configured to include a plurality of reflecting mirrors 33a and 33b in the embodiment. A configuration in which the illumination light is sequentially reflected by the reflecting mirrors 33a and 33b is adopted, but, in the embodiment, a configuration in which incident/emission plane of illumination light to the reflecting mirror 33a is orthogonal to the incident/emission plane of illumination light to the reflecting mirror 33b is adopted. The incident/emission plane is a plane including an optical axis incident on the reflecting mirror and an optical axis emitted from the reflecting mirror. For example, assuming that a three-dimensional XYZ orthogonal coordinate system is defined and illumination light is incident on the reflecting mirror 33a in the +X direction, although different from that illustrated schematically in FIG. 1, for example, the illumination light is deflected in the +Y direction by the reflecting mirror 33a and then in the +Z direction by the reflecting mirror 33b. In the example, the incident/emission plane of illumination light with respect to the reflecting mirror 33a is the XY plane, and the incident/emission plane with respect to the reflecting mirror 33b is the YZ plane. Although not illustrated, the reflecting mirrors 33a and 33b are provided with a translating mechanism and a tilting mechanism for the reflecting mirrors 33a and 33b, respectively. For example, the reflecting mirrors 33a and 33b move in parallel with an incident direction or emission direction of illumination light to themselves and tilt around a normal line to the incident/emission plane. Accordingly, for example, an offset amount and angle in the XZ plane and the offset amount and angle in the YZ plane can be independently adjusted for the optical axis of the illumination light emitted in the +Z direction from the emitted light adjustment unit 33. Although the configuration using two reflecting mirrors 33a and 33b is illustrated in the example, a configuration using three or more reflecting mirrors may be adopted.

《Beam Expander 34》

The beam expander 34 illustrated in FIG. 1 is a unit that expands a luminous flux diameter of incident illumination light, and includes a plurality of lenses 34a and 34b. An example of the beam expander 34 is a Galilean type in which a concave lens is used as the lens 34a and a convex lens is used as the lens 34b. The beam expander 34 includes a mechanism for adjusting a distance between the lenses 34a and 34b (zoom mechanism), and by adjusting the distance between the lenses 34a and 34b, a magnifying power of the luminous flux diameter is changed. The magnifying power of the luminous flux diameter by the beam expander 34 is, for example, about 5 to 10 times. Here, if the beam diameter of the illumination light emitted from the laser light source 31 is 1 mm, the beam diameter of the illumination light is expanded from about 5 mm to 10 mm. If the illumination light incident on the beam expander 34 is not a parallel luminous flux, collimation together with the luminous flux diameter can be performed by adjusting the distance between the lenses 34a and 34b (quasi-parallelization of luminous flux). For collimation of the luminous flux, a configuration in which a collimator lens is installed upstream of the beam expander 34 separately from the beam expander 34 may be adopted.

The beam expander 34 is installed on a translation stage with two axes (two degrees of freedom) or more, and is configured so that the position thereof can be adjusted for the center thereof to coincide with the incident illumination light. The beam expander 34 is also provided with a tilt angle adjustment function for two axes (two degrees of freedom) or more so that the incident illumination light coincides with the optical axis.

《Polarization Control Unit 35》

The polarization control unit 35 illustrated in FIG. 1 is an optical system for controlling a polarization state of illumination light, and is configured to include a half-wave plate 35a and a quarter-wave plate 35b. For example, when oblique incident illumination is performed by inserting a reflecting mirror 37, which will be described later, into an optical path, by making the illumination light P-polarized light by the polarization control unit 35, an amount of scattered light from the defect on the surface of the sample 1 increases compared to polarized light other than P-polarized light. If scattered light (referred to as haze) from minute irregularities on the surface of the sample itself interferes with detection of minute defects, by making the illumination light S-polarized light, haze (scattered light) can be reduced compared to polarized light other than S-polarized light. By the polarization control unit 35, illumination can be made into circularly polarized light or 45-degree polarized light intermediate between P-polarized light and S-polarized light.

《Reflecting Mirror 37》

As illustrated in FIG. 1, the reflecting mirror 37 is moved in parallel in an arrow direction by a driving mechanism (not illustrated) to move in and out of the optical path of the illumination light directed toward the sample 1, and can switch an incident path of the illumination light to the sample 1. By inserting the reflecting mirror 37 into the optical path, the illumination light emitted from the polarization control unit 35 is reflected by the reflecting mirror 37 and obliquely incident on the sample 1 via the condensing optical unit 36 and the reflecting mirror 38. On the other hand, when the reflecting mirror 37 is removed from the optical path, the illumination light emitted from the polarization control unit 35 is vertically incident on the sample 1 using an optical unit (not illustrated).

FIGS. 5 and 6 are schematic diagrams illustrating a positional relationship between the optical axis of the illumination light directed obliquely to the surface of the sample 1 by the dark-field illumination optical system 3 and an illumination intensity distribution shape thereof. FIG. 5 schematically illustrates a cross section obtained by cutting the sample 1 along the incident plane of the illumination light incident on the sample 1. FIG. 6 schematically illustrates a cross section obtained by cutting the sample 1 along a plane that is orthogonal to the incident plane of the illumination light incident on the sample 1 and includes the normal line to the surface of the sample 1.

The incident plane is a plane including an optical axis OA of the illumination light incident on the sample 1 and the normal line to the surface of the sample 1. In FIGS. 5 and 6, a part of the dark-field illumination optical system 3 is extracted and represented, and for example, illustrations of the output light adjustment unit 33 and the reflecting mirror 37 are omitted.

As illustrated in FIG. 1, when the reflecting mirror 37 is inserted in the optical path, the illumination light emitted from the laser light source 31 is condensed by the condensing optical unit 36, reflected by the reflecting mirror 38, and obliquely incident on the sample 1. As described above, the dark-field illumination optical system 3 is configured so that illumination light can be incident on the sample 1 from a direction inclined to the normal line of the surface of the sample 1. The light intensity of the oblique incident illumination is adjusted by the attenuator 32, luminous flux diameter thereof is adjusted by the beam expander 34, polarization thereof is adjusted by the polarization control unit 35, and the illumination intensity distribution is made uniform within the incident plane. Like an illumination intensity distribution (illumination profile) LD1 illustrated in FIG. 5, the illumination spot formed on the sample 1 has a Gaussian light intensity distribution in the direction s2, and a length of a beam width l1 defined by 13.5% of the peak is, for example, about 25 μm to 4 mm.

In a plane orthogonal to the incident plane and the sample surface, the illumination spot has a light intensity distribution in which peripheral intensity is weak relative to the center of the optical axis OA, like an illumination intensity distribution (illumination profile) LD2 illustrated in FIG. 6. Specifically, a Gaussian distribution reflecting the intensity distribution of light incident on the condensing optical unit 36 or an intensity distribution similar to the Bessel function of the first kind of order 1 or sinc function, which reflects an aperture shape of the condensing optical unit 36, is obtained. A length l2 of the illumination intensity distribution within the plane orthogonal to the incident plane and the sample surface is shorter than the beam width l1 illustrated in FIG. 5, and is set to, for example, from about 1.0 μm to 20 μm, to reduce the haze (scattered light) generated from the surface of the sample 1. The length l2 of the illumination intensity distribution is a length of a region having illumination intensity of 13.5% or more of the maximum illumination intensity in the plane orthogonal to the incident plane and the sample surface.

An angle of incidence (inclination angle of the incident optical axis to the normal line to the sample surface) of the illumination, which is obliquely incident on the sample 1, to the sample 1 is adjusted by the positions and angles of the reflecting mirrors 37 and 38 to an angle suitable for detecting a minute defect. The angle of the reflecting mirror 38 is adjusted by an adjustment mechanism 38a. For example, the larger the incident angle of the illumination light with respect to the sample 1 (the smaller the illumination elevation angle, which is an angle between the sample surface and the incident optical axis), the weaker the haze, which becomes noise for scattered light from minute foreign matter on the sample surface, and thus is suitable for detecting the minute defect. From the viewpoint of reducing the influence of haze on the detection of the minute defect, it is preferable to set the incident angle of the illumination light to, for example, 75 degrees or more (elevation angle of 15 degrees or less). On the other hand, in the oblique illumination, since an absolute amount of scattered light from minute foreign matter increases as the illumination incident angle decreases, it is preferable to set the incident angle of illumination light to, for example, 60 degrees or more and 75 degrees or less (elevation angle of 15 degrees or more and 30 degrees or less) from the viewpoint of increasing the amount of scattered light from the defect.

«Detection Optical Systems 4v and the Like»

The detection optical systems 4v, 4-1, 4-2, illustrated in FIG. 1 are units for condensing illumination scattered light from the sample surface, and are configured to include a plurality of optical elements including a condensing lens (objective lens). A case in which the defect inspection apparatus 100 of the embodiment is provided with 13 sets of detection optical systems will be described as an example.

FIG. 7 is a top view of a region where the detection optical systems 4v, 4-1, 4-2, . . . collect the scattered light, and corresponds to an arrangement of respective objective lenses of the detection optical systems 4v, 4-1, 4-2, . . . . In the following description, with the direction of incidence of oblique incident illumination to the sample 1 as a reference, a traveling direction (right direction in FIG. 7) of incident light with respect to the illumination spot 40 on the surface of the sample 1 as viewed from above is treated as the front side, and the opposite direction (left direction in the same) is treated as the rear side. Therefore, with respect to the illumination spot 40, a lower side in the figure is a right side, and an upper side is a left side.

Respective objective lenses of the detection optical systems 4v, 4-1, 4-2, . . . are arranged along a hemispherical surface of an upper half of a sphere (celestial sphere) centered on the illumination spot 40 with respect to the sample 1. The hemispherical surface is divided into 13 regions of L1 to L6, H1 to H6, and V, and the detection optical systems 4v, 4-1, 4-2, . . . respectively collect and condense scattered light in corresponding regions.

A region V is a region that overlaps the zenith and is located directly above the illumination spot 40 formed on the surface of the sample 1. The detection optical system 4v corresponds thereto.

Regions L1 to L6 are regions obtained by equally dividing an annular region surrounding 360 degrees around the illumination spot 40 at a low position, and are arranged in the order of regions L1, L2, L3, L4, L5, and L6 counterclockwise from the incident direction of the oblique illumination when viewed from above.

Regions L1 to L3 among the regions L1 to L6 are located on the right side of the illumination spot 40. The region L1 is located at the rear right side of the illumination spot 40. The region L2 is located on the right side of the illumination spot 40, and the region L3 is located on the front right side of the illumination spot 40.

Regions L4 to L6 are located on the left side of the illumination spot 40. The region L4 is located at the front left side of the illumination spot 40. The region L5 is located on the left side of the illumination spot 40. The region L6 is located on the rear left side of the illumination spot 40.

The remaining regions H1 to H6 are regions obtained by equally dividing an annular region surrounding 360 degrees around the illumination spot 40 at a high position (between regions L1 to L6 and region V), and the regions H1, H2, H3, H4, H5, and H6 are arranged in this order counterclockwise from the incident direction of the oblique incident illumination when viewed from above. Arrangement of the high-angle regions H1 to H6 are shifted by 30 degrees when viewed from above with respect to the low-angle regions L1 to L6.

Among the regions H1 to H6, the region H1 is located at the rear side of the illumination spot 40. The region H4 is located at the front side of the illumination spot 40. The regions H2 and H3 are located on the right side of the illumination spot 40. The region H2 is located at the rear right side of the illumination spot 40. The region H3 is located at the front right side of the illumination spot 40. The regions H5 and H6 are located on the left side of the illumination spot 40. The region H5 is located at the front left side of the illumination spot 40. The region H6 is located at the rear left side of the illumination spot 40.

In FIG. 1, scattered light incident on the detection optical systems 4v, 4-1, 4-2, . . . is condensed and guided to corresponding dark field detection sensors 5v, 5-1, 5-2, . . . , respectively. When FIG. 1 and FIG. 7 are compared, for example, the detection optical system 4-1 in FIG. 1 is an optical system that collects scattered light in the region L4 in FIG. 7. The detection optical system 4-2 is an optical system that collects scattered light in the region L6. The detection optical system 4v can be treated as an example of an optical system that collects scattered light in the region V.

The detection optical system 4v of the embodiment detects light from the illumination spot 40 formed by the dark field illumination optical system 3 and also functions as a relay optical system for detecting a spot formed by the differential interference contrast illumination system 8 and reflected light thereof by the differential interference contrast detection system 9.

«Dark Field Detection Sensors 5v, 5-1, 5-2, . . .»

The dark field detection sensors 5v, 5-1, 5-2, . . . are sensors that convert illumination scattered light condensed by the corresponding detection optical systems 4v, 4-1, 4-2, . . . into an electric signal and outputs a detection signal, photoelectrically converts a weak signal with a high gain, and for example, a photomultiplier tube and a silicon photomultiplier tube (SiPM) can be used as the dark field detection sensors. Point sensors are used as the dark field detection sensors 5v, 5-1, 5-2, . . . . Instead of the point sensor, a line sensor, an area sensor, or a multi-line sensor composed of a plurality of line sensors may be used. The dark field detection sensors 5v, 5-1, 5-2, . . . correspond to the detection optical systems 4v, 4-1, 4-2, . . . . The dark field detection sensor 5v detects illumination scattered light via a dichroic mirror 96. The wavelength characteristic and the like will be described later.

The detection optical system 4v includes the line sensor 5B for detecting differential interference contrast in addition to the dark field detection sensor 5v. That is, the line sensor 5B is a sensor unit that photoelectrically converts interference light generated by the differential interference contrast detection system 9 to generate an interference signal.

Since the line sensor 5B detects directly reflected light, it is less necessary to have a high gain than the dark field detection sensors 5v, 5-1, 5-2, . . . , and a photodiode sensor or an avalanche photodiode sensor can be used as the sensor line 5B. Although the point sensor is used in the embodiment, the line sensor, the area sensor, or the multi-line sensor may be used similarly to the dark field detection sensors 5v, 5-1, 5-2, . . . . The photomultiplier tube, SiPM, CMOS sensor, and CCD may be used. The detection signal output from the dark field detection sensors 5v, 5-1, 5-2, . . . is input to a dark field data processing unit 61 of the signal processing device 6. The detection signal output from the line sensor 5B is input to a differential interference contrast processing unit 62 of the signal processing device 6.

«Differential Interference Contrast Illumination System 8»

As illustrated in FIG. 1, the differential interference contrast illumination system 8 is configured to include a laser light source 81, an attenuator 82, a beam shaping unit 83, and a lens 84. The differential interference contrast illumination system 8 irradiates the sample from the vertical direction with illumination light for detecting the differential interference contrast, and irradiates the sample surface with an illumination spot set, which is composed of two polarized illumination spots that have different phases at a predetermined wavelength and that are offset by a predetermined shear amount.

The laser light source 81 is a unit that emits a laser beam as illumination light for detecting the differential interference contrast. To measure the differential interference contrast without being affected by the laser light source 31, a wavelength different from the wavelength of the laser light source 31 is used, typically longer than 400 nm.

The attenuator 82 has the same configuration as the attenuator 32 of the dark field illumination optical system 3, and is a unit that attenuates light intensity of irradiation light from the laser light source 81.

The beam shaping unit 83 is an optical system for shaping a beam spot of the dark field illumination system into a beam having a long axis in the direction s2, similar to the illumination spot 40 described in FIG. 2. The beam shaping unit 83 includes a plurality of lenses 83a and 83b. The beam shaping unit 83 can be constructed by a Galileo-type beam expander using a concave lens as the lens 83a and a convex lens as the lens 83b. An anamorphic prism may be used instead of the beam expander, or both may be combined.

The lens 84 forms a beam spot with desired magnification on the sample 1 side of a differential interference contrast objective lens 94 together with the differential interference contrast objective lens 94 to be described later. A focal length of the lens 84 is set longer than the focal length of the differential interference contrast objective lens 94, and a spot smaller than the illumination spot 40 emitted from the laser light source 81 is formed on the surface of the sample 1.

«Differential Interference Contrast Detection System 9»

The differential interference contrast detection system 9 illustrated in FIG. 1 is configured to include a polarization beam splitter 91, a half-wave plate 92, a Nomarski prism 93, the differential interference contrast objective lens 94, a lens 95, the dichroic mirror 96, and an image forming lens 97. The differential interference contrast detection system 9 detects differential interference contrast to calculate a height of the sample surface, and condenses reflected light of two polarized illumination spots from the sample surface to generate an image of the interference light.

Light passing through the lens 84 of the differential interference contrast illumination system 8 is guided to the polarization beam splitter 91. Light passing through the lens 84 is linearly polarized light having vibration of an electric field in the Y direction illustrated in FIG. 1. The polarization beam splitter 91 changes the direction of light by 90 degrees and makes the light incident on the half-wave plate 92. The half-wave plate 92 is installed so that a fast axis is at an angle of 45 degrees with respect to an incident polarization direction. Here, light emitted from the half-wave plate 92 becomes circularly polarized light.

The Nomarski prism 93 is made of an optical material having birefringence, and separates the circularly polarized incident light into two linearly polarized light having mutually orthogonal vibration planes.

Polarization separation of the Nomarski prism 93 will be described with reference to FIG. 8. In the Nomarski prism 93, a position for separating the light into two polarized light components can be set outside the prism. The separation position is made to coincide with a pupil position of the differential interference contrast objective lens 94, and the differential interference contrast objective lens 94 forms a beam spot in each of two polarization directions. The Nomarski prism 93 is movable in the X direction by a driving mechanism (not illustrated). Accordingly, the differential interference contrast illumination system 8 can provide a desired phase difference between the two separated light beams. The light beams of two polarization components that have passed through the differential interference contrast objective lens 94 travel substantially in parallel. Although omitted in FIG. 8, after that, the surface of the sample 1 is irradiated with the two polarized light beams via the lens 95, the detection optical system 4v, and the like. If there is a step between the two spots with the shear amount δ shifted, the phase changes between the two polarized light beams, and based thereon, the differential interference contrast detection system 9 measures a step Δh.

Referring back to FIG. 1, the description continues. The lens 95, together with the detection optical system 4v, causes two beam spots to be formed on the sample 1 by being shifted by a shear amount in the direction s2. The reflected light of the beam spots is condensed by the differential interference contrast objective lens 94 after being relayed through the detection optical system 4v and the lens 95. The dichroic mirror 96 between the detection optical system 4v and the lens 95 has characteristics of transmitting light of wavelength emitted from the laser light source 81 and reflecting a wavelength of A1, thereby excluding scattered light of light for dark field illumination from the differential interference contrast detection system 9.

The light in the polarization direction in which the two planes of vibration are orthogonal to each other and collected by the differential interference contrast objective lens 94 changes direction due to the characteristics of the birefringent material when passing through the Nomarski prism 93, and the light returns to the same original light. Here, the position of the Nomarski prism 93 is typically adjusted so that the light emitted from the Nomarski prism 93 becomes linearly polarized light when there is no height displacement on the sample surface between the two spots offset by the shear amount.

After the light emitted from the Nomarski prism 93 passes through the half-wave plate 92, the polarization beam splitter 91 transmits only light in a specific polarization direction, and the light is detected by the line sensor 5B via the image forming lens 97. If there is a height displacement at a position offset by the shear amount, the light passed through the Nomarski prism 93 becomes elliptically polarized light due to the phase difference, and a light amount transmitted through the polarization beam splitter 91 changes and the height displacement can be measured by the light amount. The phase difference, which will be described later in the specification, is defined as a phase difference when reflected light beams of the two beam spots illuminated on the sample surface are incident on the half-wave plate 92. Here, a case where the phase is shifted by the same length as the wavelength to be illuminated from the laser is described as a $2\pi[rad]$ shift.

«Control Device 71»

The control device 71 is a computer that comprehensively controls the defect inspection apparatus 100, and is configured to include a read only memory (ROM), a random access memory (RAM), other memories, a central processing unit (CPU), a field-programmable gate array (FPGA), a timer, and the like. The control device 71 implements a height shape measurement unit by executing shape measurement software stored in the memory by the CPU.

The control device 71 is connected to the user interface 72, the monitor 73, and the signal processing device 6 in a wired manner or wirelessly. The user interface 72 is a device through which a user inputs various operations, and can appropriately adopt various input devices such as a keyboard, mouse, and touch panel. The control device 71 receives encoders for the rotation stage and the translation stage, inspection conditions that are input from the user interface 72 according to operator's operations, and the like. The inspection conditions include, for example, type, size, shape, material, illumination conditions, detection conditions, of the sample 1. The control device 71 outputs a command signal for commanding operations of the stage ST, dark field illumination optical system 3, differential interference contrast illumination system 8, differential interference contrast detection system 9, and the like according to the inspection conditions, or outputs coordinate data of the illumination spot 40 synchronized with the defect detection signal to the signal processing device 6. The control device 71 also displays the inspection result of the defect by the signal processing device 6 on the monitor 73.

«Signal Processing Device 6»

The signal processing device 6 is a computer that processes detection signals input from the dark field detection sensors 5v, 5-1, 5-2, . . . and the line sensor 5B, and is configured to include a ROM, a RAM, other memories, a CPU, an FPGA, a timer, and the like, similarly to the control device 71. As an example, it is assumed that the signal processing device 6 is configured with a single computer forming a unit with a main body (the stage, illumination optical system, detection optical system, sensor, and the like) of the defect inspection apparatus 100, but the device may be configured with a plurality of computers. Here, a server can also be used for one of the plurality of computers. The signal processing device 6 is composed of the dark field data processing unit 61 that processes dark field data, the differential interference contrast processing unit 62 that processes a differential interference contrast signal, and a processing result integration unit 63 that integrates processing results of the dark field data processing unit 61 and the differential interference contrast processing unit 62.

The dark field data processing unit 61 detects a defect based on a change in scattered light intensity. Since the defect to be detected is minute with respect to the illumination beam spot, a method in which high-frequency components in the time direction are extracted from outputs of the dark-field detection sensors 5v, 5-1, 5-2, . . . , and a large point is treated as the defect can be used. For example, the defect is detected using the method disclosed in FIG. 13B of JP2015-197320A. The processing result integration unit 63 integrates defect information detected by the dark field data processing unit 61 and defect information detected by the differential interference contrast processing unit 62, which will be described later, based on the coordinates at which the defect was detected, generates defect information including feature amounts of both defect information, and transfers the result to the control device 71.

«Differential Interference Contrast Processing Unit 62»

FIG. 9 is a diagram illustrating an embodiment of the differential interference contrast processing unit 62. For the signal output from the line sensor 5B, a phase shift candidate is first calculated by a phase shift candidate computation unit 62a. In differential interference contrast detection, in which illumination is made from above and a phase shift between two beam spots separated by the shear amount in the reflected light is calculated, since brightness changes at a period of ½ of the wavelength, the phase shift candidate computation unit 62a cannot clearly specify the phase shift. A storage unit 62b accumulates the phase shift candidates. Based on data before and after accumulated in the storage unit 62b, a phase shift determination unit 62c determines the phase shift between the illumination spots offset by the shear amount. Based on the phase shift, a differential height calculation unit 62d calculates a differential height between the illumination spots offset by the shear amount. A height reconstruction unit 62e calculates a sample surface height by accumulating the differential heights in the shear direction, and a defect determination unit 62f compares the height with a predetermined height threshold to detect the defect. The differential interference contrast processing unit 62 is a height shape reconstruction unit that accumulates height displacement data between the two polarized illumination spots and reconstructs a height shape of the surface of the sample 1.

FIGS. 10A and 10B illustrate the problem of differential interference contrast detection when the sample surface is inclined. FIG. 10A illustrates step detection when a sample 1a is not inclined, and FIG. 10B illustrates step detection when a sample 1b is inclined.

If a step of the defect detected by differential interference contrast is extremely gentle, the contrast of interference light can be strengthened by increasing the shear amount. However, if the sample surface to be inspected is inclined here, the detection range is narrowed due to the inclination.

FIGS. 11A and 11B illustrate light intensity when the phase changes due to height displacement.

If the Nomarski prism 93 is adjusted so that interference light intensity detected by the line sensor 5B becomes the center of the change in light intensity when a sample surface of the sample 1a is not inclined, in the step in FIG. 11A, when a phase of the reflected light from the two beam spots incident on the half-wave plate 92 changes from $-\pi/2$ to $\pi/2$[rad], the phase thereof can be specified from the light intensity.

As illustrated in FIG. 11B, since the sample 1b has an inclined sample surface, the phase exceeds $\pi/2$[rad]. Therefore, in a region darker than brightness B1, two phases having the same brightness are generated. That is, a range for uniquely measuring the phase is exceeded.

FIG. 12A is a graph illustrating a height when the sample surface is inclined. The horizontal axis of the graph represents the position, and the vertical axis represents the height. Here, the height displacement is normalized by dividing the height displacement by a wavelength.

FIG. 12B is a graph illustrating the height displacement between shear amounts. When the graph is subjected to differential interference contrast detection and graphed under the condition that the phase is from $-\pi/2$ to $\pi/2$[rad], the graph of FIG. 12C is obtained.

FIG. 12C is a graph illustrating a relationship between light amount and position. In the graph of FIG. 12C, a region with large displacement exceeds a uniquely detectable range and normal contrast cannot be obtained. Although it is expected that the light amount is the lowest at a point where the differential height is the highest, the phase is actually inverted beyond $\pi/2$, and the point does not become the darkest point.

FIG. 12D is a graph illustrating a relationship between phase and position, and is a graph for explaining a method of calculating a phase difference candidate from the waveform illustrated in the graph of FIG. 12C. $\zeta$ in the graph is obtained by adding $\alpha$ to a phase $\Delta_{surf}$ corresponding to the sample surface. $\eta$ is obtained by subtracting the sum of $\Delta_{surf}$ and $\alpha$ from $\pi/2$.

Assuming that the height displacement is calculated with the sample surface as a reference, the defect to be detected rarely occurs on a flat sample surface, a size thereof is small relative to the sample surface, which is a region to be inspected, the inclination of the flat sample surface is small relative to the height range that can be uniquely detected, and the purpose is to correct the excess of the range due to the inclination.

Assuming that the phase corresponding to the sample surface is $\Delta_{surf}$, since the phase difference of the sample surface is shifted from a design value of 0, when a phase candidate $\Delta_1(x)$ whose phase exceeds the unique height measurement range is constrained to be $-\pi/2$ or more and $\pi/2$ or less, a region with a high probability of occurrence thereof and the original phase $\Delta_2(x)$ when the range is exceeded are represented by the following Equation (1).

[Equation 1]

$$\Delta_2(x) = \begin{cases} \text{if } \Delta_1(x) - \Delta_{surf} > 0 & \pi - \Delta_1(x) \\ \text{otherwise} & -\pi - \Delta_1(x) \end{cases} \quad (1)$$

If all the phases satisfying the condition of Equation (1) are corrected to $\Delta_2(x)$, in many cases, height measurement accuracy is lowered due to unnecessary correction. Therefore, it is necessary to extract a phase that requires correction. In the determination, it is assumed that the sample surface is basically flat and that irregularities on the flat sample surface, that is, defect candidates are isolated. Since the phase $\Delta_{surf}$ corresponding to the inclination of the sample surface can be regarded as sufficiently large for a minute defect, the phase $\Delta_{surf}$ can be calculated using a low-frequency component of $\Delta_1(x)$. As the calculation method, a moving average, a median value, or a statistically known robust average can be applied. When the phase shift at a position offset by the shear amount at a position x is $\Delta_1(x)$, the cumulative addition of the phase shift from the sample surface obtained by subtracting $\Delta_{surf}$ from $\Delta_1(x)$ is assumed to be 0 except for an isolated defect part. Therefore, an evaluation formula represented by Equation (2) is introduced.

[Equation 2]

$$E = \Sigma_{X-th_{dist}<x<X+th_{dist}} \Delta_1(x) - \Delta_{surf} \quad (2)$$

Excessive correction is prevented by correcting with Equation (1) under the condition that an evaluation formula E is close to 0.

In the graph of FIG. 12D, $\Delta_1(x)$ belonging to a region satisfying the condition of Equation (1) is segmented. If the step to be measured has a smooth shape, a boundary of exceeding the unique measurement range is always near $-\pi/2$ or near $\pi/2$, and $\Delta_2(x)$ and $\Delta_1(x)$ take the same value. - Polarity of $\Delta_1(x)$ changes sharply when the boundary of the unique measurement range is crossed. Therefore, $\Delta_1(x)$ is segmented at a point near 0 or near $\pi$ where the polarity of the differential changes, and for each segment, an evaluation value is calculated from the segment boundary and $\Delta h_1(x)$ and $\Delta h_2(x)$ of $seg_b$ and $seg_a$, from the following Equation (3).

[Equation 3]

$$ev_1(seg) = |\Delta_2(seg_b) - \Delta_1(seg_b)| + |\Delta_2(seg_e) - \Delta_1(seg_e)| \quad (3)$$

The smaller the evaluation value of Equation (3), the higher the probability of being a correction target. Therefore, $\Delta_1(x)$ is corrected to $\Delta_2(x)$ in ascending order of the probability.

The algorithm as described above is illustrated in the flowcharts of FIGS. 13A and 13B and will be described with reference to FIG. 9 as appropriate.

First, the phase shift candidate computation unit 62a of the signal processing device 6 calculates the phase candidate $\Delta_1(x)$ assuming that the phase difference is $-\pi/2$ or more and $\pi/2$ or less (step S11), and stores the calculation in the storage unit 62b.

After a predetermined length of data is accumulated in the storage unit 62b, the phase shift determination unit 62c calculates the phase difference $\Delta_{surf}$ between the average shear amounts on the sample surface from interference signal intensity (step S12), and calculates the evaluation value described in Equation (2) (step S13).

Next, the phase shift determination unit 62c extracts a region that satisfies the condition of Equation (1) as a candidate region of data to be corrected (step S14), and divides the region into segments based on $\Delta_1(x)$ and change in polarity of differential value thereof (step S15).

Next, the phase shift determination unit 62c calculates the original phase $\Delta_2(x)$ when the unique measurement range is exceeded (step S16). Then, the phase shift determination unit 62c repeats processing for each segment from steps S17 to S19. In the repetition, the phase shift determination unit 62c calculates an evaluation value $ev_1(seg)$ of each segment boundary (step S18).

The phase shift determination unit 62c arranges the segments in ascending order of the evaluation value $ev_1(seg)$ and assigns priority thereto (step S20).

The phase shift determination unit 62c repeats processing for each segment rearranged in ascending order of the evaluation value from steps S21 to S26. In the repetition, the phase shift determination unit 62c evaluates whether an absolute value of the evaluation formula E becomes smaller when $\Delta_1(x)$ belonging to the segment is corrected to $\Delta_2(x)$ from the segment with the highest priority (step S22).

In step S22, if the absolute value of the evaluation formula E becomes smaller (Yes), the phase shift determination unit 62c calculates a difference between $\Delta_2(x)$ and $\Delta_1(x)$, sets the difference as a phase $\Delta_3(x)$ to be added by the correction (step S23), updates $\Delta E$ representing the change in the evaluation formula E (step S24), and performs the following repetition.

In step S22, if the absolute value of the evaluation formula E does not become smaller (No), the phase shift determination unit 62c substitutes 0 for the phase $\Delta_3(x)$ to be added by the correction (step S25), and performs the following repetition. Here, the phase shift determination unit 62c does not perform the correction.

The phase shift determination unit 62c calculates a gain G for additional correction when ($E-\Delta E$) does not become 0 (step S27). The phase shift determination unit 62c obtains the gain G by dividing the evaluation formula E by $\Delta E$.

The phase shift determination unit 62c repeats the processing for each segment in steps S28 to S30. In the repetition processing, the phase shift determination unit 62c adds a value obtained by multiplying $\Delta_3(x)$ by the gain G to $\Delta_1(x)$ for each segment (step S29).

Finally, the differential height calculation unit 62d calculates the differential height from the phase of the difference between the obtained phase $\Delta_1(x)$ and the surface inclination of the sample surface (step S31), and the series of processing ends.

So far, although the present invention has been described with the aim of stably calculating the differential height when the sample surface is inclined, the present invention is not limited thereto, and can also be applied for detecting the height displacement exceeding the unique measurement range.

FIG. 14 illustrates a step of the sample surface having a displacement exceeding the unique measurement range.

A sample surface 1c is not inclined. To reconstruct the height by differential interference contrast detection, an error is generated due to the reconstruction if the height displacement due to the step is not detected regardless of the polarity. As a result, the step in the unique measurement range is ±⅛ or less of a wavelength λ.

FIG. 15 is a graph illustrating the relationship between the light intensity and the phase when the sample surface 1c is set to be shifted from the center between the maximum value and the minimum value of light intensity.

The phase shift between the two spots offset by the shear amount on the sample surface is shifted from ½π[rad], and the light intensity is set lower than intermediate intensity between the maximum intensity and the minimum intensity. Accordingly, it is possible to simultaneously obtain the effect of reducing the influence of incident light or electrical thermal noise of the sensor. In a region where the phase is large with respect to the inclination of the sample surface 1c, the unique measurement range is easily exceeded, but in regions where the phase is small, the unique measurement range is hardly exceeded. By doing as described above, it is possible to improve the accuracy of correction using the evaluation value of Equation (2) by preventing the unique measurement range from being exceeded at two polarities at the same time.

FIG. 16 is a block diagram of a modification of the differential interference contrast processing unit.

In the differential interference contrast processing unit 61 of the first embodiment illustrated in FIG. 9, the phase is specified first and then the differential height is calculated. In the modification of FIG. 16, instead, a differential height candidate computation unit 62a1 calculates a differential height candidate, stores the calculation in a storage unit 62b1, and a differential height determination unit 62d1 determines the differential height based on stored peripheral differential height information. The height reconstruction unit 62e reconstructs the height, and the defect determination unit 62f determines the defect.

Since there is a linear correlation between the differential height and the phase shift between the illumination spots offset by the shear amount, whichever may be processed.

FIGS. 17A and 17B are flowcharts illustrating data processing in differential interference contrast detection according to the modification, which will be described with reference to FIG. 16 as appropriate.

First, the differential height candidate computation unit 62a1 of the signal processing device 6 calculates a differential height candidate $\Delta h_1(x)$ assuming that the differential height $\Delta h_1(x)$ between the shear amounts is $-\lambda/8$ or more and $\lambda/8$ or less (step S41), and accumulates the calculation in the storage unit 62b1.

After a predetermined length of data is accumulated in the storage unit 62b1, the differential height determination unit 62d1 calculates the differential height $\Delta h_{surf}$ between the average shear amounts on the sample surface from the interference signal intensity (step S42), and calculates the evaluation formula E (step S43). The evaluation formula E in step 43 is represented by Equation (4) obtained by modifying Equation (2).

[Equation 4]

$$E = \Sigma_{X-th_{dist} < x < X+th_{dist}} \Delta h_1(x) - \Delta h_{surf} \quad (4)$$

Next, the differential height determination unit 62d1 extracts the region that satisfies the condition of Equation (1) as a candidate region of data to be corrected (step S44), and divides the region into segments based on $\Delta h_1(x)$ and the change in polarity of differential value thereof (step S45).

Next, the differential height determination unit 62d1 calculates the original differential height $\Delta h_2(x)$ when the unique measurement range is exceeded (step S46). Then, the differential height determination unit 62d1 repeats the processing for each segment from steps S47 to S49. In the repetition, the differential height determination unit 62d1 calculates the evaluation value $ev_1(seg)$ of each segment boundary (step S48).

The differential height determination unit 62d1 arranges the segments in ascending order of the evaluation value $ev_1(seg)$ and assigns priority thereto (step S50).

The differential height determination unit 62d1 repeats the processing for each segment rearranged in ascending order of the evaluation value from steps S51 to S56. In the repetition, the differential height determination unit 62d1 evaluates whether an absolute value of the evaluation formula E becomes smaller when $\Delta h_1(x)$ belonging to the segment is corrected to $\Delta h_2(x)$ from the segment with the highest priority (step S52).

In step S52, if the absolute value of the evaluation formula E becomes smaller (Yes), the differential height determination unit 62d1 calculates a difference between $\Delta h_2(x)$ and $\Delta h_1(x)$, sets the calculation as a differential height $\Delta h_3(x)$ to be added by the correction (step S53), updates $\Delta E$ representing the change in the evaluation formula E (step S54), and performs the following repetition.

In step S52, if the absolute value of the evaluation formula E does not become smaller (No), the differential height determination unit 62d1 substitutes 0 for the differential height $\Delta h_3(x)$ to be added by the correction (step S55), and performs the following repetition. Here, the differential height determination unit 62d1 does not perform the correction.

The differential height determination unit 62d1 calculates the gain G for additional correction when (E−$\Delta E$) does not become 0 (step S27). The differential height determination unit 62d1 obtains the gain G by dividing the evaluation formula E by $\Delta E$.

The differential height determination unit 62d1 repeats the processing for each segment in steps S58 to S60. In the repetition processing, the differential height determination unit 62d1 adds a value obtained by multiplying $\Delta h_3(x)$ by the gain G to $\Delta h_1(x)$ for each segment (step S59). Thus, when the differential height $\Delta h_1(x)$ of each segment is calculated, the series of processing ends.

Second Embodiment

In the first embodiment, the differential interference contrast illumination system 8 forms one beam spot of each of the P-polarized light and the S-polarized light on the sample surface, condenses the interference light by the differential interference contrast detection system 9, and detects light intensity by a point sensor in the sensor unit. The defect is detected by the detected result.

In contrast, in the second embodiment, the differential interference contrast illumination system 8, the differential interference contrast detection system 9, and the differential interference contrast processing unit 62 are differently embodied, and the other parts are the same. Regarding the embodiment, portions different from the first embodiment will be described.

«Differential Interference Contrast Illumination System 8 and Differential Interference Contrast Detection System 9»

FIG. 18 is a schematic diagram of the differential interference contrast illumination system 8 and the differential interference contrast detection system 9 according to the second embodiment of the present invention.

The differential interference contrast illumination system 8 of the second embodiment further includes a beam dividing unit 85 in addition to the same configuration as the differential interference contrast illumination system 8 of the first embodiment. The beam dividing unit 85 is configured to include a diffractive optical element 85a and a cylindrical lens 85b.

The differential interference contrast detection system 9 of the second embodiment is configured in the same manner as in the first embodiment.

As illustrated in FIG. 18, light emitted from the laser light source 81 is incident on the beam dividing unit 85 by adjusting the light amount by the attenuator 82. The beam dividing unit 85 is configured with the diffractive optical element 85a and the cylindrical lens 85b. The diffractive optical element 85a branches the beam into two directions, arranges the branch point to be shifted from the diffraction optical element 85a by a focal length, and adjusts light beams emitted from the beam dividing unit 85 to be parallel. However, the light beams are not completely parallel here. In the Nomarski prism 93, it is necessary to adjust the cylindrical lens 85b so that a desired shift occurs. For the adjustment, a position of the cylindrical lens 85b may be controlled in the optical axis direction by a driving mechanism (not illustrated).

The beam shaping unit 83, the lens 84, the polarization beam splitter 91, and the half-wave plate 92 of the second embodiment have the same configurations as those of the first embodiment. In the Nomarski prism 93, the two beams branched by the beam dividing unit 85 are separated into two linearly polarized light beams having mutually orthogonal vibration planes. The set of two linearly polarized light beams which are branched is called an illumination spot set. That is, two illumination spot sets are emitted from the Nomarski prism 93. Two light beams incident on the Nomarski prism 93 from the half-wave plate 92 are typically incident on the Nomarski prism 93 to have a distance of several tens of μm. Accordingly, it is possible to set the phase difference of reflected light beams from the two illumination spots offset by the shear amount and belonging to each illumination spot set to be different from each other. The phase difference of each of the two illumination spot sets can be adjusted by a driving mechanism (not illustrated) of the cylindrical lens 85b.

The light emitted from the Nomarski prism 93 passes through the differential interference contrast objective lens 94, and then illuminates the sample 1 via the lens 95, the dichroic mirror 96, the detection optical system 4v, and the like, as in the first embodiment.

After that, the differential interference contrast detection system 9 collects the reflected light from the sample 1. During illumination by the Nomarski prism 93, the reflected light beams of the light, which is separated into two linearly polarized light beams whose polarization directions are orthogonal to each other, are integrated into the same light again to become interference light, and reaches a line sensor 5Ba via the half-wave plate 92, the polarization beam splitter 91, and the image forming lens 97. The line sensor 5Ba photoelectrically converts the interference light to generate an interference signal.

FIG. 19 is a diagram illustrating a configuration of the line sensor 5Ba.

The line sensor 5Ba includes two line sensors 5Ba-1 and 5Ba-2. The line sensor 5Ba is a sensor unit that photoelectrically converts the interference light generated by the differential interference contrast detection system 9 to generate an interference signal.

Images i1 and i2 of interference light i are respectively formed from the illumination spot set. The line sensors 5Ba-1 and 5Ba-2 are located corresponding to the respective interference light images i1 and i2. Each of the line sensors 5Ba-1 and 5Ba-2 is divided by an array of pixels, and can be configured with a CMOS imaging element, a CCD imaging element, a photodiode array, or the like. Assuming that the alignment of light of the interference light images i1 and i2 is shifted, each pixel has a rectangular shape long in the direction s1.

Instead of the two line sensors 5Ba-1 and 5Ba-2, a two-dimensional sensor such as a two-dimensional CMOS sensor may be used to detect light of the pixels corresponding to the interference light images i1 and i2. The line sensors 5Ba-1 and 5Ba-2 are arranged in parallel with a length L in the direction s1. When the sample moves in the direction s1 at a speed of V and image forming magnification is M, a position illuminated by the interference light image i1 will be imaged by the interference light image i2 after the time represented by Equation (5).

[Equation 5]
$$\Delta t = \frac{L}{MV} \quad (5)$$

Therefore, in the data processing unit, by providing a time delay of $\Delta t$ between the line sensors 5Ba-1 and 5Ba-2, the differential height can be calculated for a specific point based on the interference light images with different phase differences between the P-polarized light and the S-polarized light.

«Modification of Second Embodiment»

FIG. 20 illustrates a modification of the differential interference contrast illumination system 8 and the differential interference contrast detection system 9 of the second embodiment.

In the differential interference contrast detection system 9 of the modification of FIG. 20, a polarization beam splitter 99 is newly disposed, and line sensors 5Bc and 5Bd are disposed instead of the line sensor 5Ba. Position of light receiving portions of the line sensors 5Bc and 5Bd is illustrated in FIG. 21. The line sensor 5Bc captures the interference light image i2 and the line sensor 5Bd captures the interference light image i1, thereby having the same function as the second embodiment illustrated in FIGS. 18 and 19.

A sensor including a single linear light receiving portion is a general-purpose product. In contrast, there are few sensors provided with two linear light receiving portions. Therefore, the configuration of the modification of FIGS. 20 and 21 can be constructed more easily than the configuration of the second embodiment illustrated in FIGS. 18 and 19. Since the position of the line sensors 5Bc and 5Bd can be flexibly set, adjustment becomes easy.

However, by providing the polarization beam splitter 99 of FIG. 20, the light amount is reduced by half, and more space is required for mounting. However, basic characteristics in differential interference contrast detection are the same.

FIGS. 22A and 22B are graphs illustrating an example of an interference state between two illumination spot sets. The vertical axis of FIG. 22A indicates the light intensity, the horizontal axis indicates the phase, the phase shift when the reflected light from the two spots is incident on G2 due to the height displacement between the two spots separated by the shear amount formed for one illumination spot set is indicated, and the Y-axis indicates the light intensity at that time. In the embodiment in which light is incident from above and reflected light thereof is detected from above, since the height displacement affects both illumination incidence and reflection, the range in and the range $2\pi$ described on the horizontal axis of the graph correspond to the height displacement of a half of the wavelength.

The solid line in FIG. 22A is a light amount 2102 detected by a specific pixel of the line sensor 5Ba-1. The dashed line is a light amount 2103 detected by a specific pixel of the line sensor 5Ba-2.

The interference light image i1 of a first spot set has a phase difference of $\frac{1}{3}\pi$ between the two spots offset by the shear amount. The interference light image i2 of a second spot set has a phase difference of $-\frac{1}{3}\pi$ between the two spots offset by the shear amount.

Although both the light amount 2102 and the light amount 2103 have phases at which the same light amount is obtained twice in a period $2\pi$, the combination of the same light amount is only once in the period $2\pi$ when viewed as a combination of the two. Therefore, the unique measurement range is expanded to $2\pi$.

In the first embodiment illustrated in FIGS. 11A and 11B and the modification of the first embodiment illustrated in FIG. 15, there is a concern that a region where the change in light intensity with respect to the phase is 0 occurs in a region where the phase is 0 or $\pi$ and height detection sensitivity is greatly reduced near the region.

However, in the modification of the second embodiment, even in a region where a differential value with respect to the phase of light intensity of one illumination spot set is 0, differential value of light intensity of the other illumination spot set is not 0, and thus a large decrease in sensitivity does not occur.

FIG. 22B is a vector representation of the light amounts 2102 and 2103.

A vector 2112 and a vector 2113 are obtained by projecting the light amount 2102 and the light amount 2103 onto vectors shifted by $\pm\pi/3$[rad] from the X-axis, respectively. If a light amount obtained by subtracting the light amount detected by the line sensor 5Ba-1 is $V_1$ and the light amount detected by the line sensor 5Ba-2 after $\Delta t$ is $V_2$, a phase $\Delta_1$ corresponding to the differential height to be obtained is determined by the Equation (6).

[Equation 6]
$$\Delta_1(x) = a\tan2\left(\frac{V_1(x) - V_2(x)}{\sqrt{3}}, V_1(x) + V_2(x) - I_{max}(x)\right) \quad (6)$$

Here, $I_{max}$ indicates the maximum detected light amount to be detected at the phase where the interference intensity is maximum. The maximum detected light amount can be obtained by the following Equation (7).

[Equation 7]
$$I_{max}(x) = \frac{4(V_1(x) + V_2(x)) \pm 2\sqrt{(V_1(x) + V_2(x))^2 - (V_1(x) - V_2(x))^2}}{3} \quad (7)$$

When measuring with two illumination spot sets as illustrated in Equation (7), $I_{max}$ cannot be obtained in real time except for the phase difference of $\pm\pi/2$[rad]. However, if $I_{max}$ does not fluctuate substantially over time, among the calculated $I_{max}$, the one closest to the maximum light amount measured in advance may be applied. Fluctuation factors may include power fluctuation of the laser light beam and fluctuation of reflectance of the sample surface.

If the height profile illustrated in the graph of FIG. 12B is subjected to differential interference contrast detection having the phase shift illustrated in FIGS. 22A and 22B, the line sensors 5Ba-1 and 5Ba-2 output the light amounts, respectively, as illustrated in the graph of FIG. 23A. In both cases, the light amount exceeds the maximum light amount and, when considered alone, a unique measurement range is exceeded.

FIG. 23B illustrates the result of the phase reconstruction using Equation (6). As illustrated here, even if the unique detection range is exceeded alone, if the measurement range of the differential height is in range, the height displacement can be specified. The height reconstruction unit 62e calculates the height by accumulating differential heights shifted by the shear amount δ.

In the embodiment, a case where the two illumination spot sets interfere with each other by shifting phases of two linearly polarized light beams, whose polarization directions are orthogonal to each other, by +π/3 and −π/3 has been described, but it is also possible to implement the embodiment in other interference states.

FIG. 24 is a graph illustrating interference intensity with respect to the height displacement when the phase is varied.

A first graph is a graph of the light amount of two illumination spot sets that interfere with each other by shifting the phase by ±π/6. A second graph is a graph of the light amount of two illumination spot sets that interfere with each other by shifting the phase by ±π/4. A third graph is a graph of the light amount of two illumination spot sets that interfere with each other by shifting the phase by ±π/3. A fourth graph is a graph of the light amount of two illumination spot sets that interfere with each other by shifting the phase by ±π/2. A fifth graph is a graph of the light amount of two illumination spot sets that interfere with each other by shifting the phase by ±2π/3. A sixth graph is a graph of the light amount of two illumination spot sets that interfere with each other by shifting the phase by ±3π/4. A seventh graph is a graph of the light amount of two illumination spot sets that interfere with each other by shifting the phase by ±5π/6.

FIG. 25 is a graph illustrating sensitivity when the height is changed. It is assumed that the phase on the sample plane is set to 0.

In a first case where interference is caused by shifting the phase difference by ±π/2, height measurement sensitivity on the sample surface is the best, but the sensitivity decreases sharply from the position where the phase is shifted by π/4 due to height displacement of the sample surface, and the height displacement cannot be detected at the point where the phase is shifted by π/2. When interference is caused by shifting the phase difference by ±π/2, the unique measurement range becomes ±π/2, and the unique measurement range cannot be expanded even if two polarized light beams are used.

In a second case where interference is caused by shifting the phase by ±π/4 or ±3π/4, the height measurement sensitivity does not change regardless of height displacement, such that stable height measurement becomes possible. However, the best measurement sensitivity is inferior for the phase of ±π/2.

In a third case where interference is caused by shifting the phase by ±π/3 or ±2π/3, the best height measurement sensitivity is better than the case of ±π/4. Meanwhile, even when the phase of the height at which the height measurement sensitivity decreases is ±0.5π, the decrease in sensitivity is small. Therefore, for example, in a case where the step with small displacement from the sample surface is detected with high sensitivity and sensitivity may be lowered for large displacement, a better measurement result can be obtained than when the height measurement sensitivity is constant.

In a fourth case where interference is caused by shifting the phase by ±π/6, the heights of the regions having high sensitivity and low sensitivity are changed from those in the third case.

$I_{max}$ when the phase between beam spots formed by linearly polarized light beams (P-polarized light and S-polarized light) having two vibration directions orthogonal to each other in the illumination spot set is shifted by +ΔP and −ΔP can be calculated by the following Equation (8).

[Equation 8]

$$I_{max}(x) = \frac{V_1(x) + V_2(x) \pm 2\cos\Delta P \sqrt{V_1(x)V_2(x)}}{\sin^2 \Delta P} \quad (8)$$

Meanwhile, the phase $\Delta_1$ due to the height displacement is obtained by the following Equation (9).

[Equation 9]

$$\Delta_1(x) = \begin{cases} \text{if } \Delta P \neq \pi/2 & a\tan2\left(\frac{V_1(x) - V_2(x)}{\sin\Delta P}, \frac{V_1(x) + V_2(x) - I_{max}(x)}{\cos\Delta P}\right) \\ \text{otherwise} & a\sin\left(\frac{V_1(x) - V_2(x)}{V_1(x) + V_2(x)}\right) \end{cases} \quad (9)$$

Since calculation accuracy of $I_{max}$ can be estimated better as sin ΔP increases, the error decreases in the order of the first case, the third case, the second case, and the fourth case. From estimation accuracy of the height displacement near the sample surface and the calculation accuracy of $I_{max}$, it is desirable that the phase shift between each illumination spot is ±π/6 or more and ±5π/6 or less. In the first case, since the measurement range is narrow and the phase shift due to the height displacement is extremely bad around ±π/2, it is desirable that the phase is shifted by π/12 or more from π/2+Nπ, which is an intermediate phase shift between the first case and the third case, where N is an integer.

《Flowchart of Differential Interference Contrast Processing Unit》

The flowchart of the differential interference contrast processing unit illustrated in FIG. 26 is a modification of the processing of the first embodiment illustrated in FIG. 13A. In the first embodiment, the unique measurement range is π[rad] in the phase, but in the second embodiment, the range is doubled to 2π[rad]. Therefore, similar processing can be performed only by changing the range in FIG. 13A. In the processing of the first embodiment of FIG. 13A, the phase range is expressed as 0 or more and π or less, but in the second embodiment, the phase range is −π or more and less than n.

First, the phase shift candidate computation unit 62a of the signal processing device 6 calculates the phase candidate $\Delta_1(x)$ assuming that the phase difference is −π or more and π or less (step S11a), and stores the calculation in the storage unit 62b. For the calculation, Equation (8) or Equation (9) or the modified Equation (6) or Equation (7) is used. If it is known that $I_{max}$ is uniform across the sample surface, a pre-measured $I_{max}$ may be used instead of $I_{max}$ calculated by Equation (9) or Equation (7).

After a predetermined length of data is accumulated in the storage unit 62b, the phase shift determination unit 62c calculates the phase difference $\Delta_{surf}$ between the average shear amounts on the sample surface from the interference signal intensity (step S12), and calculates the evaluation value described in Equation (2) (step S13).

Next, the phase shift determination unit 62c extracts a region that satisfies the condition of Equation (1) as a candidate region of data to be corrected (step S14a), and divides the region into segments based on $\Delta_1(x)$ and the change in polarity of differential value thereof (step S15a).

Next, the phase shift determination unit 62c calculates the original phase $\Delta_2(x)$ when the unique measurement range is exceeded (step S16a). Here, the unique measurement range is a range in which the phase difference is $-\pi$ or more and n or less. The processing in step S17 and subsequent steps is the same as the processing illustrated in FIGS. 13A and 13B. In the flowchart of FIG. 26, although the unique measurement range and the phase calculation range are represented by $-\pi$ or more and less than $\pi$, it is also possible to calculate the phase range represented as 0 or more and $2\pi$ or less in the same principle.

Third Embodiment

The third embodiment is a modification of the second embodiment. Although the second embodiment has a feature that there is no phase that causes a large decrease in sensitivity compared to the first embodiment, since the second embodiment detects only the light amount of a phase of $\pm\frac{1}{3}\pi$ among the phases of $\pm\pi$, it cannot be said that the sensitivity is always uniform. When $I_{max}$ changes dynamically, there may be a case where $I_{max}$ at any timing cannot be obtained accurately. To solve the problem, differential interference contrast detection is performed based on three sets of illumination spot sets.

FIG. 27 illustrates a layout diagram of the optical system. The changes from the second embodiment are a beam dividing unit 851 and a line sensor 5Be. The beam dividing unit 85 uses the 2-branching diffraction optical element 85a, but the beam dividing unit 851 uses a 3-branching diffraction optical element 85a1.

FIG. 28 illustrates a configuration of the line sensor 5Be. By using the three-branching diffractive optical element 85a1 in the beam dividing unit 851, images i1, i2, and i3 of three illumination spots are formed on a sensor surface of the line sensor 5Be. To capture the image, the line sensor 5Be formed with linear light receiving portions 5Be-1, 5Be-2, and 5Be-3 is used.

FIG. 29 illustrates the light amount when the height displacement represented by the phase is taken on the X-axis.

A light amount 2501 is the light amount detected by the light receiving portion 5Be-1. A light amount 2502 is the light amount detected by the light receiving portion 5Be-2. A light amount 2503 is the light amount detected by the light receiving portion 5Be-3.

The light receiving portions 5Be-2 and 5Be-3 capture images at the same position as the light receiving portion 5Be-1, after the lapse of $\Delta t$ and 26t from the light-receiving portion 5Be-1, respectively.

To integrate and process images at the same position, differential height calculation processing is performed by delaying the output of each light receiving portion.

If the light amount obtained by subtracting the light amount detected by the light receiving portion 5Be-1 is set to V1a, the light amount detected after $\Delta t$ from the detection by the light receiving portion 5Be-1 by the light receiving portion 5Be-2 is set to V2a, and the light amount detected after $\Delta t$ from detection by the light receiving portion 5Be-2 by the light receiving portion 5Be-3 is set to V3a, a phase $\Delta_5$ corresponding to the differential height to be obtained is determined by the following Equation (10).

[Equation 10]

$$\Delta_5 = a\tan2\left(\frac{V_{1a} - V_{2a}}{\sqrt{3}}, \frac{V_{1a} + V_{2a} - 2V_{3a}}{3}\right) \quad (10)$$

Fourth Embodiment

FIG. 30 is a schematic diagram of the differential interference contrast illumination system 8 and the differential interference contrast detection system 9 according to the fourth embodiment.

The fourth embodiment is also a modification of the second embodiment. In the third embodiment, the beam branching unit requires three-branching, and the difficulty of beam branching is increased. To reduce the difficulty, the differential interference contrast detection system 9 of the fourth embodiment reduces the number of illumination spot sets to two, similarly to the second embodiment. On the other hand, instead of the polarization beam splitter 91, a half beam splitter 911 is disposed.

A beam diffuser 86 shields light transmitted through the half beam splitter 911. Illumination light directed toward the half-wave plate 92 by the half beam splitter 911 forms images of two beam spot sets on the sample surface. Here, the phase difference, which is $\pm\pi/3$ in the second embodiment, is changed to $\pm\pi/4$. As in the second embodiment, the reflected light returns to the half-wave plate 92 and then the reflection intensity is reduced to half by the half beam splitter 911 and transmitted therethrough. Next, the reflected light passes through the image forming lens 97 and then separated into two polarized light beams by the polarization beam splitter 99. The light is detected by line sensors 5Ba and 5Ba1. The line sensor 5Ba1 includes the same light receiving portion as that of the line sensor 5Ba. The light beams separated by the polarization beam splitter 99 are inverted in light intensity with respect to the phase shift of the reflected light intensity, and result in interference at the half-wave plate 92 that is shifted in phase by $\pi$ with respect to the phase shift between the illumination spots that are separated by the shear amount and belong to each illumination spot set. The interference is illustrated in FIG. 31.

FIG. 31 is a graph illustrating the correspondence between the phase expression of height displacement and the light intensity of interference light by differential interference contrast.

The displacement height represented by the phase is indicated by the X-axis, and the light amount detected by each light receiving portion here is illustrated. Light amounts 2702 and 2702a correspond to the image i1 of the illumination spot on the sensor surface, and the sum of the light amounts is always constant. Light amounts 2703 and 2703a correspond to the image i2 of the illumination spot on the sensor surface.

(Modification)

The present invention is not limited to the embodiments described above, and includes various modifications. For example, the embodiments described above have been described in detail to explain the present invention in an easy-to-understand manner, and are not necessarily limited to those having all the configurations described. A part of the configuration of an embodiment can be replaced with the configuration of another embodiment, and a configuration of another embodiment can be added to the configuration of an embodiment. For a part of the configuration of each embodiment, other configurations can be added, deleted or replaced.

Some or all of the configurations, functions, processing units, processing means, and the like described above may be implemented by hardware such as an integrated circuit. The configurations, functions, and the like described above may be implemented by software, by interpreting and executing a program for implementing each function by a processor. Information such as a program, table, and file that implement each function can be placed in a recording device such as a memory, hard disk, and solid state drive (SSD), or a recording medium such as a flash memory card and a digital versatile disk (DVD).

In each embodiment, control lines and information lines indicate those considered necessary for explanation, and not all control lines and information lines are necessarily shown on the product. In fact, it may be considered that almost all configurations are interconnected.

REFERENCE SIGNS LIST

1: sample
100: defect inspection apparatus (surface inspection apparatus)
ST: scanning device (scanning unit)
3: dark field illumination optical system
31: laser light source
32: attenuator
33: emitted light adjustment unit
34: beam expander
35: polarization control unit
36: condensing optical unit
37, 38: reflecting mirror
4v, 4-1, 4-2, . . . : detection optical system
40: illumination spot
5v, 5-1, 5-2, . . . : dark field detection sensor sensor
5B, 5Ba, 5Ba1, 5Bc, 5Bd, 5Be: line sensor
6: signal processing device
61: dark field data processing unit
62: differential interference contrast processing unit
63: processing result integration unit
71: control device
72: user interface
73: monitor
8: differential interference contrast illumination system
82: attenuator
83: beam shaping unit
84: lens
9: differential interference contrast detection system
91: polarization beam splitter
92: half-wave plate
93: Nomarski prism
94: differential interference contrast objective lens
95: lens
96: dichroic mirror
97: image forming lens
99: polarization beam splitter

The invention claimed is:

1. A surface inspection apparatus comprising:
a differential interference contrast illumination system that irradiates a substantially flat sample surface with an illumination spot set, which is composed of two polarized illumination spots that have different phases at a predetermined wavelength and that are offset by a predetermined shear amount;
a differential interference contrast detection system that condenses reflected light beams of the two polarized illumination spots reflected from the sample surface to generate interference light beams;
a scanning unit that scans the sample surface using the two polarized illumination spots;
a sensor unit that photoelectrically converts the interference light beams generated by the differential interference contrast detection system to generate interference signals;
a height displacement measurement unit that processes the interference signals to measure height displacement between the two polarized illumination spots; and
a height shape reconstruction unit that accumulates height displacement data of the two polarized illumination spots and reconstructs a height shape of the sample surface, wherein
the height shape restoration unit reconstructs a height shape of the sample surface by correcting the height displacement data, which is a phase shift exceeding a unique measurement range uniquely measurable with a specific illumination spot set, so that a cumulative addition of a phase shift from the sample surface obtained by subtracting a phase shift corresponding to an inclination of the sample surface from a phase shift in a shear amount direction approaches 0 except for an isolated defect part.

2. The surface inspection apparatus according to claim 1, wherein
the height displacement measurement unit calculates an inclination of the sample surface,
selects a signal assumed to be an interference signal exceeding the unique measurement range from the interference signals based on the inclination of the sample surface, and
calculates the height displacement such that an absolute value of a cumulative addition in a shear amount direction of a reference height displacement of the sample surface, which is obtained by subtracting the inclination of the sample surface from the height displacement at each position within a predetermined section that is large with respect to a measurement target on the sample surface becomes smaller.

3. A surface inspection apparatus comprising:
a differential interference contrast illumination system that irradiates a sample surface with an illumination spot set, which is composed of two polarized illumination spots that have different phases at a predetermined wavelength and that are offset by a predetermined shear amount;
a differential interference contrast detection system that condenses reflected light beams of the two polarized illumination spots reflected from the sample surface to generate interference light beams;
a scanning unit that scans the sample surface using the two polarized illumination spots;
a sensor unit that photoelectrically converts the interference light beams generated by the differential interference contrast detection system to generate interference signals;
a height displacement measurement unit that processes the interference signals to measure height displacement between the two polarized illumination spots; and
a height shape reconstruction unit that accumulates height displacement data of the two polarized illumination spots and reconstructs a height shape of the sample surface, wherein
the differential interference contrast illumination system uses the two polarized illumination spots, that have different phases at the predetermined wavelength and that are offset by the predetermined shear amount, as one illumination spot set, and simultaneously irradiates the sample surface with two or more illumination spot sets of the predetermined wavelength, the differential interference contrast detection system condenses the reflected light beams of the two polarized illumination spots reflected from the sample surface to generate interference light beams, each of the two polarized illumination spots is arranged in a direction in which the scanning unit scans the sample surface, the scanning unit scans with a predetermined time delay so that each illumination spot set measures a differential height at the same position on the sample surface, the sensor unit independently detects an image of the illumination spot set, and the height shape reconstruction unit measures the height displacement by combining interference images of different illumination spots acquired at different timings.

4. The surface inspection apparatus according to claim 3, wherein the differential interference contrast illumination system includes a diffractive optical element that branches a laser beam, a beam dividing unit that emits laser beams branched by the diffractive optical element in parallel, and a Nomarski prism on which the light beams emitted from the beam dividing unit are incident on different positions, respectively, and a phase difference when integrating the reflected light beams of the two illumination spots that configure the illumination spot set into the same light is different between different illumination spot sets.

5. The surface inspection apparatus according to claim 3, wherein the illumination spot sets are two sets, and phases of each of the illumination spot sets are separated by $\pi/6$[rad] or more and $5\pi/6$[rad] or less.

6. The surface inspection apparatus according to claim 3, wherein the illumination spot sets are two sets, and the sensor unit detects differential interference images having four interference states.

7. Shape measurement software that causes a computer to execute:

a procedure for temporarily determining phase shift of reflected light between two points separated by a shear amount on a sample surface from differential interference contrast images of the sample surface;

a procedure for storing the phase shift of the reflected light between the two points in a memory;

a procedure for measuring a phase shift due to an inclination of the sample surface from a low frequency component of a shift amount of phase in a shift direction of a shear amount stored in the memory;

a procedure for calculating a corrected phase shift by specifying data of which temporarily determined phase shift exceeds a unique measurement range from a light amount for which the phase shift of the reflected light in a shear amount direction stored in the memory is near an integral multiple of $\pi$[rad]; and a procedure for measuring a height shape of the sample surface by accumulating differences between the corrected phase shift and the phase shift of the sample surface at points separated by the shear amount.

8. The shape measurement software according to claim 7, wherein in the procedure for calculating the corrected phase shift, a reference phase shift of the sample surface obtained by subtracting the phase shift of the sample surface from the corrected phase shift is cumulatively added for a predetermined region so that an absolute value of the cumulative addition becomes smaller.

9. The shape measurement software according to claim 7, wherein two of the differential interference contrast images are combined and input from two sets of illumination spot sets, and the phases of each of the illumination spot sets are separated by $\pi/12$[rad] or more from $\pi/2+N\pi$.

* * * * *